United States Patent
Sepehrnoori et al.

(10) Patent No.: US 11,506,805 B2
(45) Date of Patent: Nov. 22, 2022

(54) SYSTEMS, METHODS, AND APPARATUS FOR TRANSIENT FLOW SIMULATION IN COMPLEX SUBSURFACE FRACTURE GEOMETRIES

(71) Applicants: Sim Tech LLC, Katy, TX (US); Board of Regents, The University of Texas System, Austin, TX (US)

(72) Inventors: Kamy Sepehrnoori, Austin, TX (US); Yifei Xu, Houston, TX (US); Wei Yu, College Station, TX (US); Jijun Miao, Katy, TX (US)

(73) Assignees: Sim Tech LLC, Katy, TX (US); Board of Regents, The University of Texas System, Austin, TX (US)

( * ) Notice: Subject to any disclaimer, the term of this patent is extended or adjusted under 35 U.S.C. 154(b) by 440 days.

(21) Appl. No.: 16/700,063

(22) Filed: Dec. 2, 2019

(65) Prior Publication Data

US 2020/0200929 A1 Jun. 25, 2020

Related U.S. Application Data

(60) Provisional application No. 62/776,631, filed on Dec. 7, 2018.

(51) Int. Cl.
  *G01V 1/28* (2006.01)
  *G01V 1/46* (2006.01)
  (Continued)

(52) U.S. Cl.
  CPC ............... *G01V 1/282* (2013.01); *G01V 1/46* (2013.01); *G01V 1/50* (2013.01); *G06F 17/16* (2013.01);
  (Continued)

(58) Field of Classification Search
  CPC . G01V 1/282; G01V 1/46; G01V 1/50; G01V 2210/644; G01V 2210/646; G01V 1/302
  See application file for complete search history.

(56) References Cited

U.S. PATENT DOCUMENTS 5,992,519 A 11/1999 Ramakrishnan et al.
6,313,837 B1 11/2001 Assa et al.
(Continued)

FOREIGN PATENT DOCUMENTS

| CA | 2818790 A1 * | 12/2013 | ............... G01V 1/00 |
| WO | WO2004/049216 | 6/2004 | |
| WO | WO2017/030725 | 2/2017 | |

OTHER PUBLICATIONS

Jose Sergio de Araujo Cavalcante Filho et al., Implementation of a preprocessor for embedded discrete fracture modeling in an IMPEC compositional reservoir simulator, 2015, SPE 173289-MS, Houston, USA.

(Continued)

*Primary Examiner* — Mischita L Henson
(74) *Attorney, Agent, or Firm* — Victor H. Segura

(57) ABSTRACT

Systems and methods for simulating subterranean regions having multi-scale fracture geometries. Non-intrusive embedded discrete fracture modeling formulations are applied in conjunction with commercial simulators to efficiently and accurately model subsurface transient flow characteristics in regions having complex hydraulic fractures, complex natural fractures, or a combination of both, and geometries including corner point grids.

18 Claims, 22 Drawing Sheets

(51) Int. Cl.
G06F 17/16 (2006.01)
G01V 1/50 (2006.01)
(52) U.S. Cl.
CPC .. *G01V 2210/644* (2013.01); *G01V 2210/646* (2013.01)

(56) References Cited

U.S. PATENT DOCUMENTS

| | | | |
|---|---|---|---|
| 7,248,259 B2 | 7/2007 | Fremming | |
| 7,478,024 B2 | 1/2009 | Gurpinar et al. | |
| 7,523,024 B2 | 4/2009 | Endres et al. | |
| 7,542,037 B2 | 6/2009 | Fremming | |
| 7,565,278 B2 | 7/2009 | Li et al. | |
| 2008/0133186 A1* | 6/2008 | Li | G06F 30/23 703/2 |
| 2018/0347320 A1* | 12/2018 | Renaudeau | E21B 41/00 |
| 2019/0025460 A1 | 1/2019 | Mustapha | |
| 2019/0186255 A1 | 6/2019 | Mustapha | |
| 2020/0184130 A1* | 6/2020 | Sepehrnoori | E21B 41/0092 |

OTHER PUBLICATIONS

Thomas Graf et al., A method to discretize nonplanar fractures for 3D subsurface flow and transport simulations, international Journal for Numerical Methods in Fluids, 2007, Wiley InterScience, Canada.
Ali Moinfar, Development of an efficient embedded discrete fracture model for 3D compositional reservoir simulation in fractured reservoirs, 2013, The University of Texas at Austin, Texas, USA.

* cited by examiner

- ○    Well location
- ⇔    Connection between matrix cell and matrix cell
- ←······→    NNC 1: Connection between fracture cell and matrix cell
- ←------→    NNC 2: Connection between fracture cell and fracture cell for the same fracture
- ←— — —→    NNC 3: Connection between fracture cell and fracture cell for different fractures

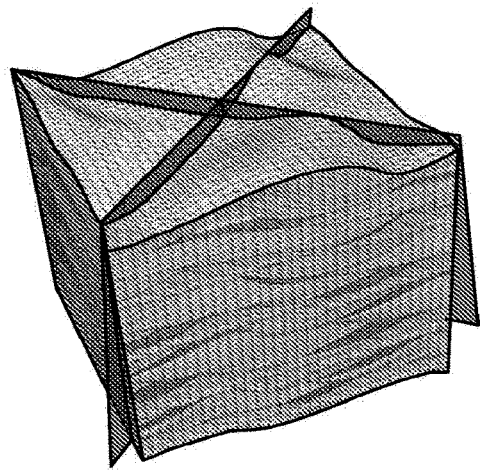 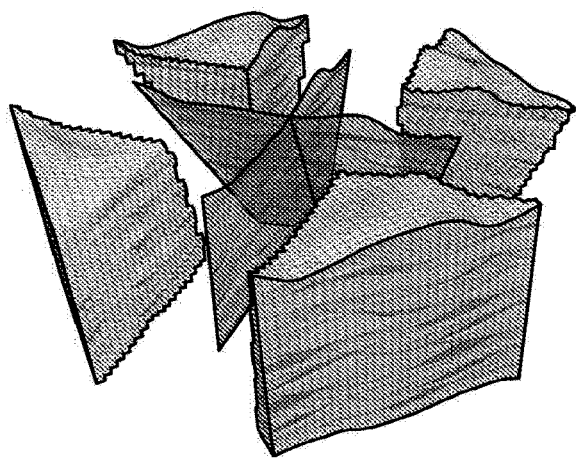
FIG. 7A　　　　　　　　FIG. 7B
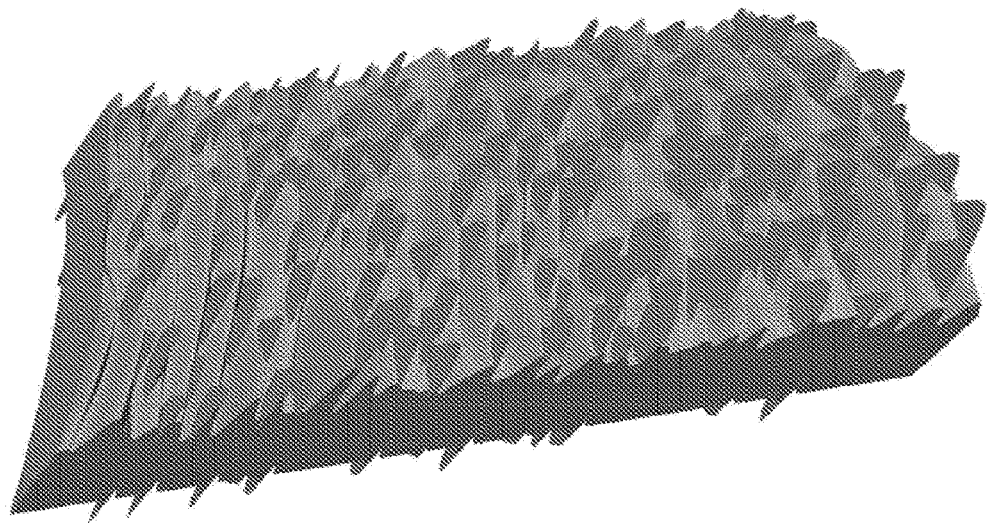
FIG. 8

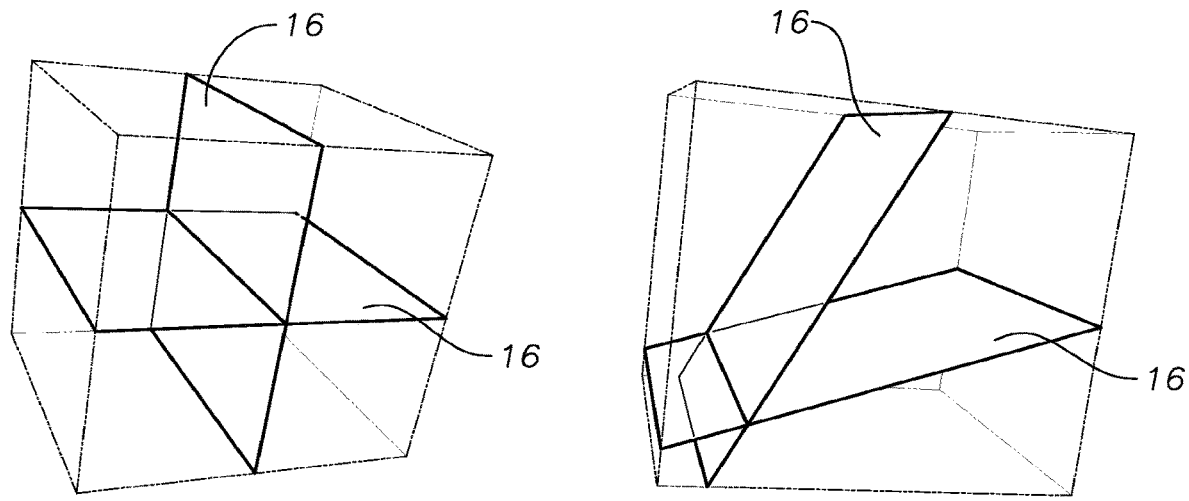
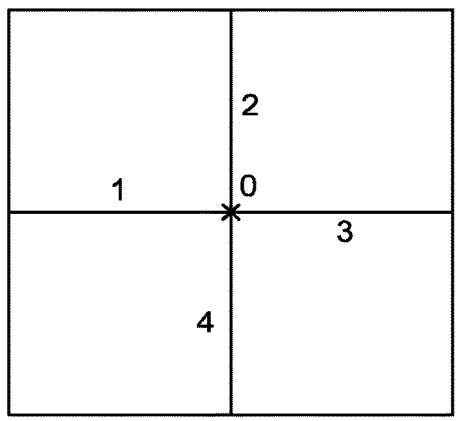
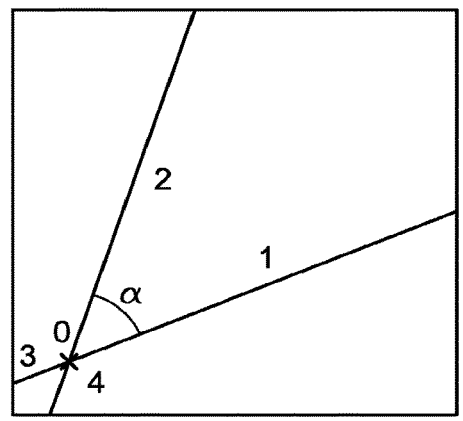
FIG. 12A FIG. 12B

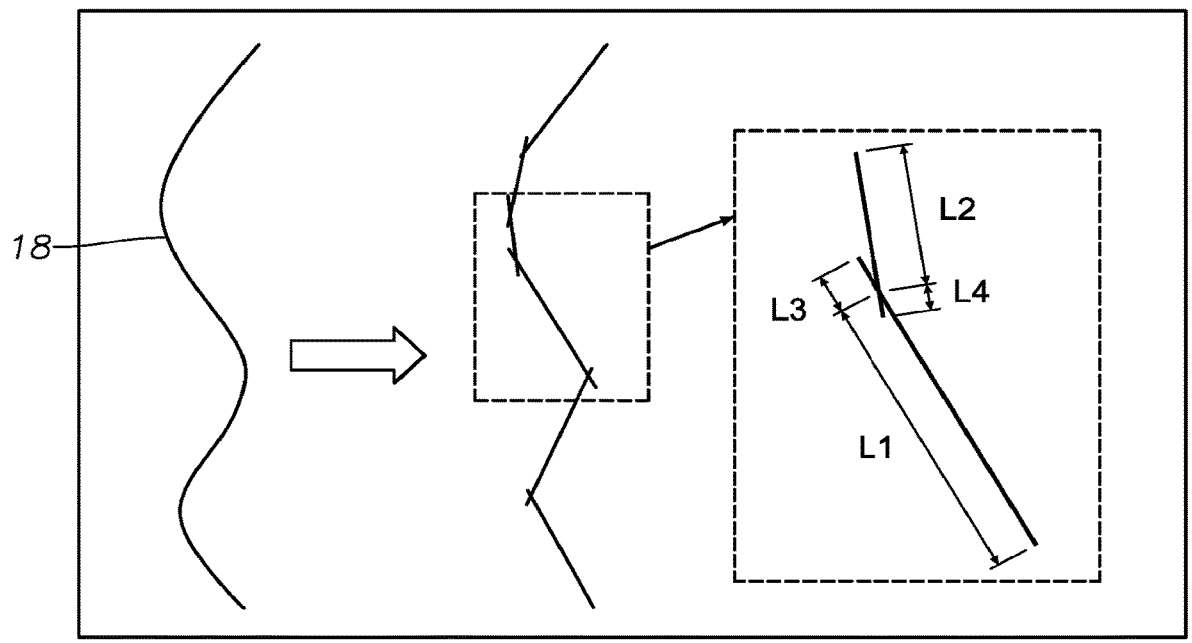
FIG. 14
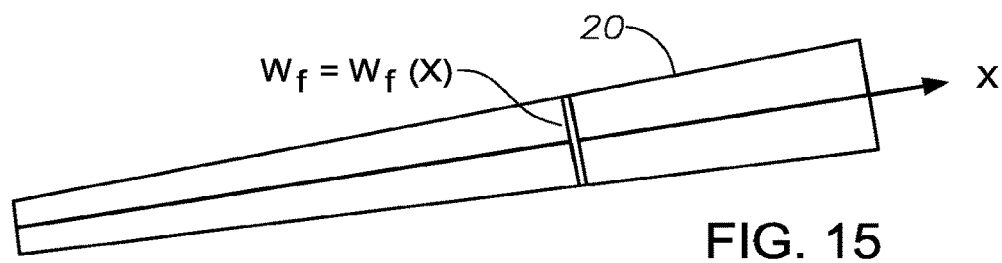
FIG. 15
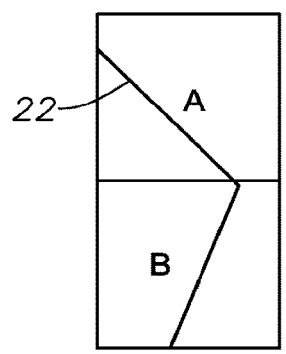 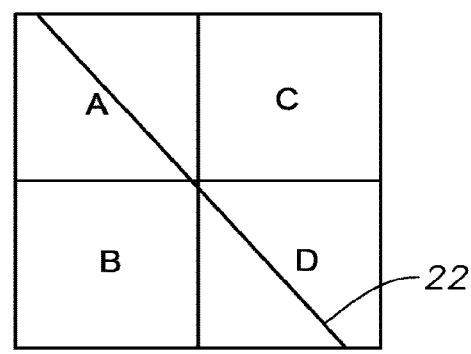
FIG. 16A  FIG. 16B

SYSTEMS, METHODS, AND APPARATUS FOR TRANSIENT FLOW SIMULATION IN COMPLEX SUBSURFACE FRACTURE GEOMETRIES

CROSS REFERENCE TO RELATED APPLICATIONS

This application claims priority to U.S. Provisional Patent Application No. 62/776,631, filed on Dec. 7, 2018, titled "Systems, Methods, and Apparatus for Transient Flow Simulation in Complex Subsurface Fracture Geometries." The entire disclosure of Application No. 62/776,631 is hereby incorporated herein by reference.

FIELD OF THE INVENTION

The present disclosure relates generally to methods and systems for the simulation of subterranean regions with multi-scale complex fracture geometries, applying non-intrusive embedded discrete fracture modeling formulations with simulators.

BACKGROUND

The recovery of natural resources (e.g., oil, gas, geothermal steam, water, coal bed methane) from subterranean formations is often made difficult by the nature of the rock matrix in which they reside. Some formation matrices have very limited permeability. Such "unconventional" subterranean regions include shale reservoirs, siltstone formations, and sandstone formations. Technological advances in the areas of horizontal drilling and multi-stage hydraulic fracturing have improved the development of unconventional reservoirs. Hydraulic fracturing is a well stimulation technique used to increase permeability in a subterranean formation. In the fracturing process, a fluid is pumped into casing lining the wellbore traversing the formation. The fluid is pumped in at high pressure to penetrate the formation via perforations formed in the casing. The high-pressure fluid creates fissures or fractures that extend into and throughout the rock matrix surrounding the wellbore. Once the fractures are created, the fluids and gases in the formation flow more freely through the fractures and into the wellbore casing for recovery to the surface.

Since the presence of fractures significantly impacts the flow behavior of subterranean fluids and gases, it is important to accurately model or simulate the geometry of the fractures in order to determine their influence on well performance and production optimization. A conventional method for simulation of fluid flow in fractured reservoirs is the classic dual-porosity or dual-permeability model. This dual-continuum method considers the fractured reservoir as two systems, a fracture system and a matrix system. This method is suitable to model small-scale fractures with a high density. It cannot handle large scale fractures like those created during hydraulic fracturing operations. In addition, this method cannot deal with fractures explicitly. In order to handle complex fracture geometries, a conventional technique of unstructured gridding is utilized. However, conventional reservoir simulators using unstructured gridding are limited to vertical fractures. Unstructured gridding methods also entail complex gridding issues and an expensive computational cost.

Corner point grids are widely used in reservoir simulation to represent realistic reservoir geometry. In corner point grids, a series of coordinate lines and depths are given to construct a reservoir model. For a single gridblock, the positions of its eight corner points are specified individually. Compared to Cartesian grids, corner point grids provide a more flexible definition of block geometries, which enables the capability to represent certain geological features, such as sloping faults and cross-stratified beds, and complex reservoir boundaries.

Similar to faults, fractures are also an important geological feature in hydrocarbon reservoirs. A large number of fractures, especially natural fractures, might exist in certain types of reservoirs. When corner point grids are used for such reservoirs, although coordinate lines may be adjusted to represent the orientations of a limited number of fractures, it is difficult and sometimes unrealistic to explicitly grid all the fractures in such a manner. Therefore, an effective and efficient approach needs to be adopted to simulate fractures in corner point grids.

Transient flow around hydraulic fractures has long been an important topic in tight reservoirs. During hydraulic fracturing, complex fracture networks may be generated due to a stress shadow effect or pre-existing natural fractures. Trilinear flow models, semi-analytical models, and numerical models have been developed to consider the influence of complex fracture networks on transient flow. Nonetheless, a challenging problem persists in modelling realistic fractures with three-dimesional complex geometries for reservoir analysis and production analysis. Thus, a need remains for improved techniques to efficiently and accurately simulate the transient flow for complex fracture geometries, such as non-orthogonal and nonplanar fractures in multi-scale subsurface geometries.

SUMMARY

According to an aspect of the invention, a method for simulating a subterranean region having fracture geometries is disclosed. In this embodiment, a) data representing a subterranean region is obtained, the data comprising a matrix grid and fracture parameters; b) gridblocks close to fractures in the matrix grid are identified; c) the size of gridblocks among the identified matrix gridblocks is refined; d) a determination is made if the refined gridblocks meet a specified criterion; e) steps (b)-(d) are repeated if the criterion of step (d) is not met; f) if the criterion of step (d) is met, proceed to step (g); g) calculate intersections between the refined gridblocks and the fractures; and h) the calculated intersections are used for generation of a simulation of the subterranean region.

According to another aspect of the invention, a system for simulating a subterranean region having fracture geometries is disclosed. The system includes at least one processor; a memory linked to the processor, the memory having instructions stored therein, which when executed cause the processor to perform functions including to: a) input data representing a subterranean region, the data comprising a matrix grid and fracture parameters; b) use the input data to identify gridblocks close to fractures in the matrix grid; c) refine the size of gridblocks among the identified matrix gridblocks; d) determine if the refined gridblocks meet a specified criterion; e) repeat steps (b)-(d) if the criterion of step (d) is not met; f) proceed to step (g) if the criterion of step (d) is met; g) calculate intersections between the refined gridblocks and the fractures; and h) produce output values corresponding to the calculated intersections for generation of a simulation of the subterranean region.

According to another aspect of the invention, a method for simulating a subterranean region having fracture geometries is disclosed. The method includes detecting geometrical intersections between matrix gridblocks and fractures associated with a subterranean region; cutting the fractures into segments along matrix gridblock boundaries; applying a pore-volume cutoff for small fracture segments; calculating connections between segments inside a fracture and between connected segments belonging to intersecting fractures; calculating intersections between well trajectories associated with the subterranean region and fracture segments; computing transmissibility factors for non-neighboring connections and well indices associated with the subterranean region; creating gridblocks in a grid domain and modifying the gridblock properties to represent fracture segments; canceling connections and adding non-neighboring connections for the created gridblocks; adding well perforations on the gridblocks; and generating a simulation of the subterranean region using a simulator.

BRIEF DESCRIPTION OF THE DRAWINGS

The following figures form part of the present specification and are included to further demonstrate certain aspects of the present disclosure and should not be used to limit or define the claimed subject matter. The claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

FIG. 7A, in accordance with some embodiments of the present disclosure, depicts a model of two intersecting fractures;

FIG. 7B, in accordance with some embodiments of the present disclosure, depicts the model of FIG. 7A with illustrated segment vertices;

FIG. 8, in accordance with some embodiments of the present disclosure, depicts a reservoir geometry represented by a corner point grid;

FIG. 12A, in accordance with some embodiments of the present disclosure, depicts a schematic of a fracture intersection with all subsegments having similar dimensions;

FIG. 12B, in accordance with some embodiments of the present disclosure, depicts a schematic of a fracture intersection with a high contrast between the subsegment areas;

FIG. 14, in accordance with some embodiments of the present disclosure, depicts a schematic of the modeling of a nonplanar fracture;

FIG. 15, in accordance with some embodiments of the present disclosure, depicts a 2D schematic of a fracture segment with varying aperture;

FIG. 16A, in accordance with some embodiments of the present disclosure, depicts a 2D schematic of small fracture segments in a matrix grid;

FIG. 16B, in accordance with some embodiments of the present disclosure, depicts another 2D schematic of small fracture segments in a matrix grid;

DETAILED DESCRIPTION

Figure 1A:
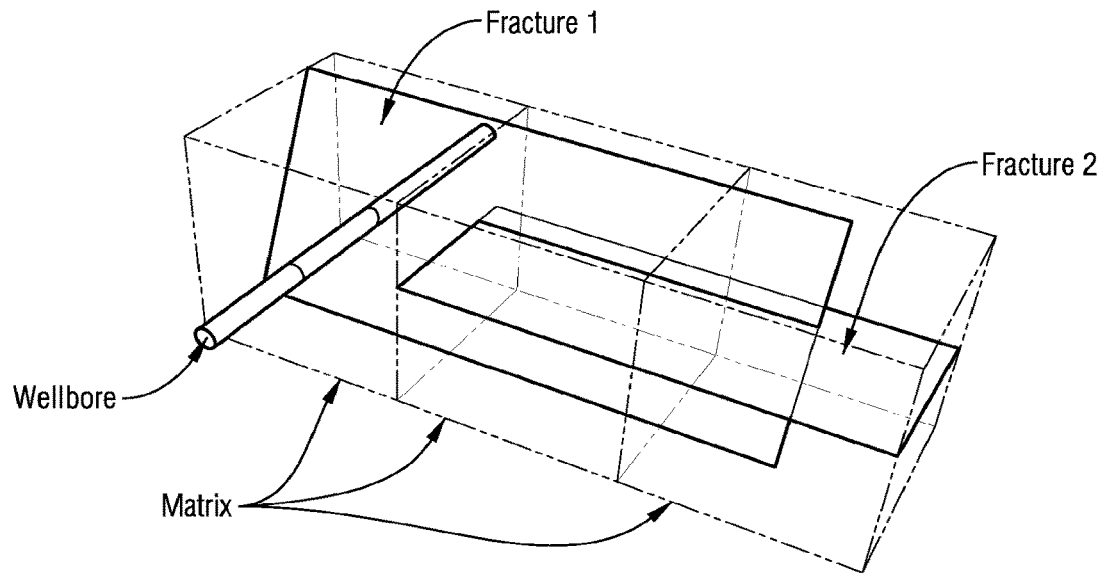
FIG. 1A, in accordance with some embodiments of the present disclosure, depicts a schematic of a subsurface physical domain representation using a formulation for handling complex fractures.

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation are described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

Embodiments of this disclosure present efficient techniques to model subterranean regions with improved accuracy for simulating near-fracture flow, and transient flow around complex fracture geometries. Through non-neighboring connections (NNCs), an embedded discrete fracture modeling (EDFM) formulation is applied to data representing a subterranean region to accurately model or simulate formations with complex geometries such as fracture networks and nonplanar fractures. The data representing the subterranean region to be modeled may be obtained by conventional means as known in the art, such as formation evaluation techniques, reservoir surveys, seismic exploration, etc. The subterranean region data may comprise information relating to the fractures, the reservoir, and the well(s), including number, location, orientation, length, height, aperture, permeability, reservoir size, reservoir permeability, reservoir depth, well number, well radius, well trajectory, etc. An important advantage of EDFM is its compatibility with conventional reservoir simulators. Since the corner point is a standard and a frequently used type of grid in traditional simulators, the application of EDFM to corner point grids provides a wider range to the EDFM approach in geologically complex reservoirs.

Some embodiments utilize data representing the subterranean region produced by conventional reservoir simulators as known in the art. For example, commercial oilfield reservoir simulators such as those offered by Computer Modelling Group Ltd., Schlumberger Technology Corporation's ECLIPSE® product, Landmark's Nexus® Suite, and tNavigator®, developed by Rock Flow Dynamics, can be used with embodiments of this disclosure. Other examples of conventional simulators are described in U.S. Pat. No. 5,992,519 and WO2004/049216. Other examples of these modeling techniques are proposed in WO2017/030725, U.S. Pat. Nos. 6,313,837, 7,523,024, 7,248,259, 7,478,024, 7,565,278, and 7,542,037. Conventional simulators are designed to generate models of subterranean regions, producing data sets including a matrix grid, fracture parameters, well parameters, and other parameters related to the specific production or operation of the particular field or reservoir. Embodiments of this disclosure provide a non-intrusive application of an EDFM formulation that allows for insertion of discrete fractures into a computational domain and the use of a simulator's original functionalities without requiring access to the simulator source code. The embodiments may be easily integrated into existing frameworks for conventional or unconventional reservoirs to perform various analyses as described herein.

I. EDFM in Conventional Finite-Difference Reservoir Simulators

Embodiments of this disclosure employ an approach that creates fracture cells in contact with corresponding matrix cells to account for the mass transfer between continua. Once a fracture interacts with a matrix cell (e.g. fully or partially penetrating a matrix cell), a new additional cell is created to represent the fracture segment in the physical domain. The individual fractures are discretized into several fracture segments by the matrix cell boundaries. To differentiate the newly added cells from the original matrix cells, these additional cells are referred to herein as "fracture cells."

Figure 1B:
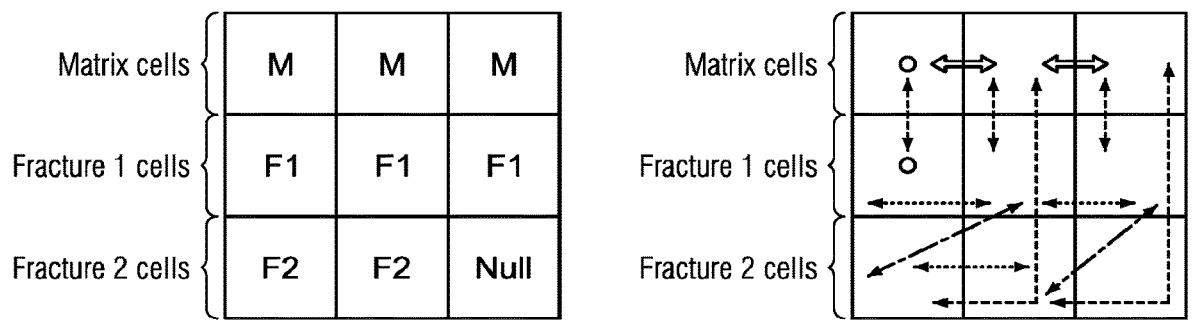
FIG. 1B, in accordance with some embodiments of the present disclosure, depicts a schematic of a computational domain using the formulation for handling the representation in FIG. 1A.

FIG. 1A depicts the procedure to add fracture cells in the EDFM using a simple case with only three matrix blocks and two fractures. FIG. 1A depicts the physical domain. FIG. 1B depicts the corresponding computational domain. In this exemplary embodiment, the physical domain includes three matrix cells, two inclined fractures and one wellbore. Before adding the two fractures, the computational domain includes three matrix cells: cell 1 (M), cell 2 (M), and cell 3 (M). After adding the fractures, the total number of cells will increase. Fracture 1 intersects three matrix cells and is discretized into three fracture segments. In the computational domain, three new extra fracture cells are added: cell 4 (F1), cell 5 (F1), and cell 6 (F1). Similarly, fracture 2 intersects two matrix cells and is discretized into two fracture segments. Two new extra fracture cells are added: cell 7 (F2) and cell 8 (F2). Since a structured grid is used in this exemplary embodiment, every row should have the same number of cells, therefore one Null cell is also introduced. The total number of cells increases from three (1×3=3) to nine (3×3=9). The depth of each fracture cell is defined as the depth of the centroid of the corresponding fracture segment. In some embodiments, physical properties (e.g., permeability, saturation, etc.) may be assigned to each fracture cell. For example, an effective porosity value may be assigned for each fracture cell to maintain the pore volume of the fracture segment:

$$\phi_f = \frac{S_{seg} w_f}{V_b}, \quad (1)$$

where $\phi_f$ is the effective porosity for a fracture cell, $S_{seg}$ is the area of the fracture segment perpendicular to the fracture aperture, $w_f$ is the fracture aperture, and $V_b$ is the bulk volume of the cells assigned for the fracture segment.

Some conventional reservoir simulators generate connections between the cells. After adding the new extra fracture cells, the EDFM formulation cancels any of these simulator-generated connections. The EDFM then identifies and defines the NNCs between the added fracture cells and matrix cells. NNCs are introduced to address flow communication between cells that are physically connected but not neighboring in the computational domain. The EDFM calculates the transmissibility based on the following definitions:

a) NNC 1: connection between fracture cell and matrix cell
b) NNC 2: connection between fracture cell and fracture cell for the same fracture
c) NNC 3: connection between fracture cell and fracture cell for different fractures.

These different types of NNCs are illustrated in FIG. 1B. The cells in each NNC pair are connected by transmissibility factors. In addition to these NNCs, the connections between fractures and wells are also introduced by the EDFM. When a fracture segment intersects the wellbore trajectory (as shown in FIG. 1A), a corresponding fracture cell is defined as a wellblock by adding a well location for this cell as shown in FIG. 1B.

This general procedure may be implemented with conventional reservoir simulators or with other applications that generate similar data sets. As a non-intrusive method, the calculations of connection factors, including NNC transmissibility factors and a fracture well index, depend on the gridding, reservoir permeability, and fracture geometries. Embodiments of this disclosure apply a preprocessor to provide the geometrical calculations. Taking the reservoir and gridding information as inputs, the preprocessor performs the calculations disclosed herein and generates an output of data values corresponding to fracture locations, connectivity parameters, geometry parameters, the number of extra grids, the equivalent properties of these grids, transmissibility factors, and NNC pairings. Embodiments of the preprocessor may be developed using conventional programming languages (e.g., PYTHON™, FORTRAN™, C, C++, etc.). Additional description regarding the preprocessor is provided below.

II. Calculation of NNC Transmissibility and Fracture Well Index

Figure 2:
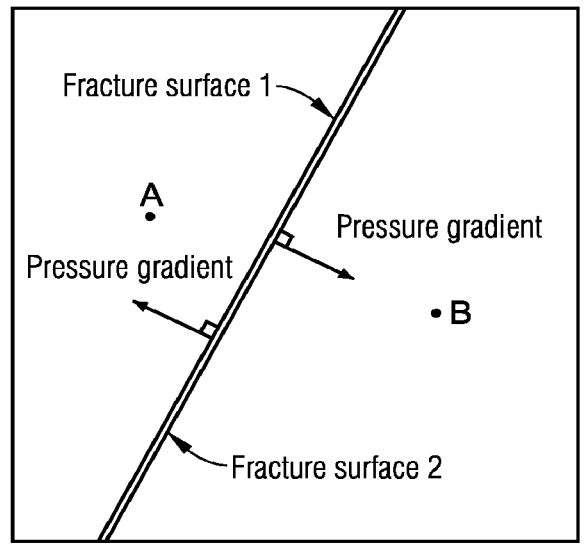
FIG. 2, in accordance with some embodiments of the present disclosure, depicts a schematic of a connection between a fracture cell and a matrix cell.

Matrix-Fracture Connection. The NNC transmissibility factor between a matrix and fracture segment depends on the matrix permeability and fracture geometry. When a fracture segment fully penetrates a matrix cell, if one assumes a uniform pressure gradient in the matrix cell and that the pressure gradient is normal to the fracture plane as shown in FIG. 2, the matrix-fracture transmissibility factor is $$T_{f-m} = \frac{2A_f (K \cdot \vec{n}) \cdot \vec{n}}{d_{f-m}}, \quad (2)$$

where $A_f$ is the area of the fracture segment on one side, K is the matrix permeability tensor, $\vec{n}$ is the normal vector of the fracture plane, $d_{f-m}$ is the average normal distance from matrix to fracture, which is calculated as $$d_{f-m} = \frac{\int_V x_n dV}{V}, \quad (3)$$

where V is the volume of the matrix cell, dV is the volume element of matrix, and $x_n$ is the distance from the volume element to the fracture plane. A more detailed derivation of Equation (2) is provided in Appendix A.

If the fracture does not fully penetrate the matrix cell, the calculation of the transmissibility factor should take into account that the pressure distribution in the matrix cell may deviate from the previous assumptions. In order to implement a non-intrusive process, one can assume that the transmissibility factor is proportional to the area of the fracture segment inside the matrix cell.

III. EDFM in Corner Point Grids

There are several differences in the definition of corner point grids compared to that of Cartesian grids. The main aspect of these differences is on block geometry, and they greatly extend the type of geological features that corner point grids can represent. However, as the transmissibility calculation of the EDFM relies on parameters obtained from geometrical calculations, the special features of corner point grids also complicates the calculation of transmissibilities in the EDFM. This section discusses the unique challenges and solutions pertaining to corner point grids.

Figure 3:
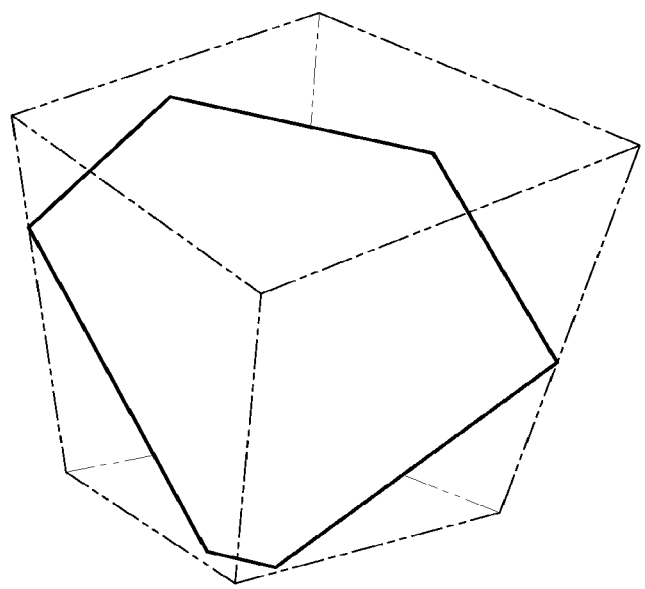
FIG. 3, in accordance with some embodiments of the present disclosure, depicts a gridblock geometry in corner point grids.

Non-Cuboid block geometry. A unique type of connection in the EDFM is the Type 1 NNC, the formulation for transmissibility factor calculation is:

$$T_{f-m} = \frac{2A_f \left(\overset{\text{⟷}}{K} \cdot \vec{n}\right) \cdot \vec{n}}{d_{f-m}}, \quad (4)$$

where $T_{f-m}$ is the transmissibility, $A_f$ is the area of fracture segment on one side, $\overset{\text{⟷}}{K}$ is the matrix permeability tensor, $\vec{n}$ is the unit normal vector of the fracture plane, and $d_{f-m}$ is the average normal distance between the fracture plane and the matrix block. In Equation (4), both $A_f$ and $d_{f-m}$ require accurate geometrical calculations, whose complexity heavily depends on block geometries. Different from the definition of Cartesian grids where all the coordinates of the block vertices can be determined using six numbers (two for x, two for y, and two for z), in corner point grids, 24 floating-point numbers are used to completely define the geometry of a single block (eight for x, eight for y, and eight for z). This results in irregular matrix block shapes, where the angles between neighboring faces may not be 90°, or the faces of the block may not maintain a rectangular shape. As shown in FIG. 3, the gridblock is a hexahedron instead of a cuboid. As an example of the difference between a cuboid and a hexahedron in terms of geometrical calculation, the basic idea to check whether a point is inside a cuboid is not suitable for hexahedron, while the latter is more complicated to implement.

Definition of Block Faces. Each face of a hexahedron is defined by four points. In corner point grids, since the coordinates of the four points in a block face are independently defined (using coordinate lines and z-coordinates of vertices), these four points may not be coplanar. Such faces are not suitable for geometrical calculation. Therefore, another approach is taken to solve this. For each face with non-coplanar points, a line is drawn to split such faces into two triangles. The lines may be drawn in a way that for the same face belonging to different gridblocks, the splitting lines are the same. After the splitting, each face is divided into two triangular faces, and the total number of actual faces of the gridblock will increase by one. In general, this number can increase from six to up to twelve, as shown in FIGS. 4A-4D. The final geometry of the gridblock can be described as a polyhedron with six to twelve faces. Correspondingly, if the fracture plane fully penetrates such gridblocks, the resulting fracture segments can also have up to twelve edges, as shown in FIG. 4D.

Figure 4A:
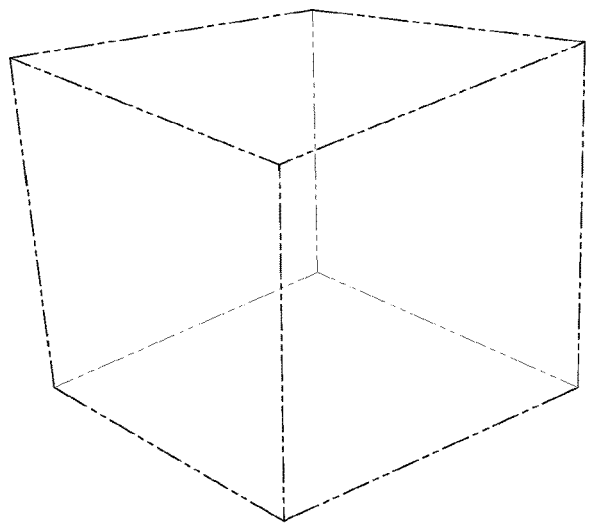
FIG. 4A, in accordance with some embodiments of the present disclosure, depicts a gridblock where all the points in a single face are coplanar.
Figure 4B:
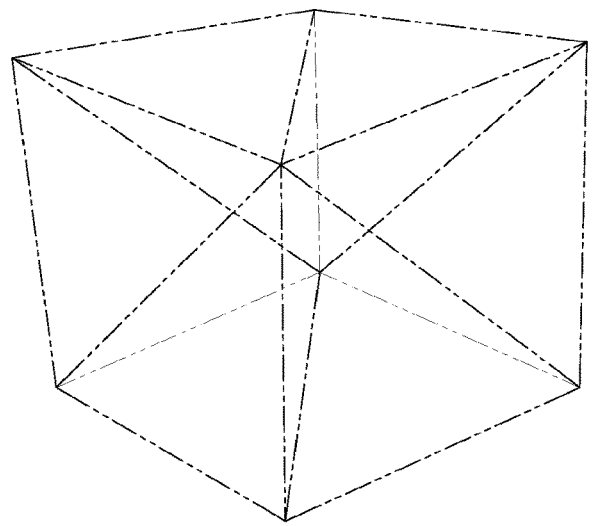
FIG. 4B, in accordance with some embodiments of the present disclosure, depicts a gridblock where all faces have non-coplanar points.
Figure 4C:
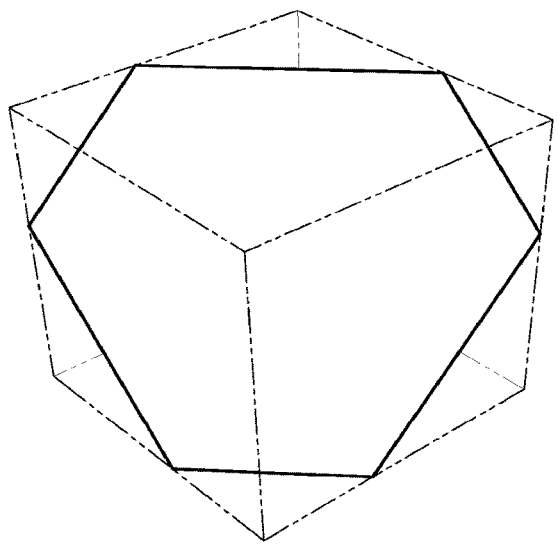
FIG. 4C, in accordance with some embodiments of the present disclosure, depicts a created fracture segment.
Figure 4D:
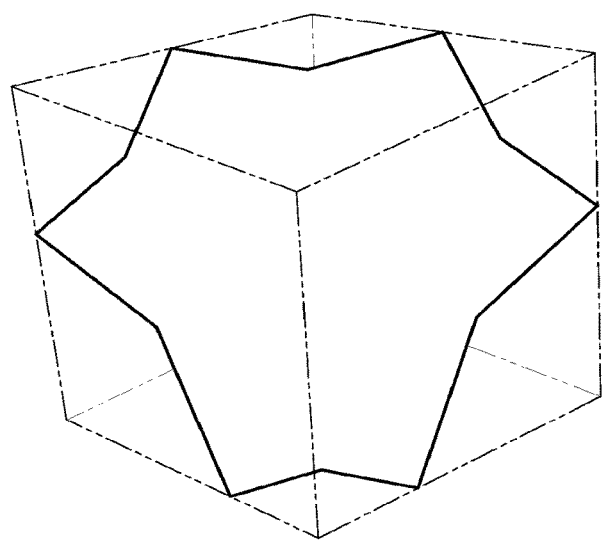
FIG. 4D, in accordance with some embodiments of the present disclosure, depicts a created fracture segment when a fracture fully penetrates a gridblock.

FIG. 4A depicts a gridblock where all the points in a single face are coplanar. FIG. 4B depicts a gridblock where all faces have non-coplanar points. The inner lines represent the additional lines drawn to split the faces. FIG. 4C depicts the created fracture segment when a fracture fully penetrates the gridblock of FIG. 4A. FIG. 4D depicts the created fracture segment when a fracture fully penetrates the gridblock of FIG. 4B. When a fracture fully penetrates a regular gridblock (shown in FIG. 4A), the fracture segment can have up to six vertices as shown in FIG. 4C. However, for the gridblock geometry shown in FIG. 4B, the fracture segment can have up to twelve vertices, as shown in FIG. 4D.

It is highly probable to generate concave polyhedra after splitting the faces containing non-coplanar points. If a split face is shared by two neighboring gridblocks, a concave polyhedron will be created on one side of the face. When a polygon intersects a concave polyhedron, there is a possibility of ending up with a concave polygon, as shown in FIG. 4D. Most geometrical algorithms on polygons assume convexity to make use of the special properties of convex polygons and simplify the calculation. However, to solve for this, a general intersection algorithm applicable to both convex and concave polygons may be used.

Figure 5A:
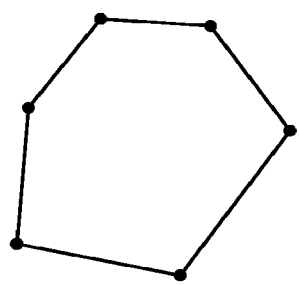
FIG. 5A, in accordance with some embodiments of the present disclosure, depicts convex polygons with connected vertices.
Figure 5A:
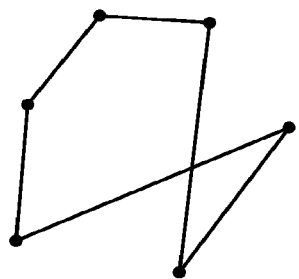
Figure 5B:
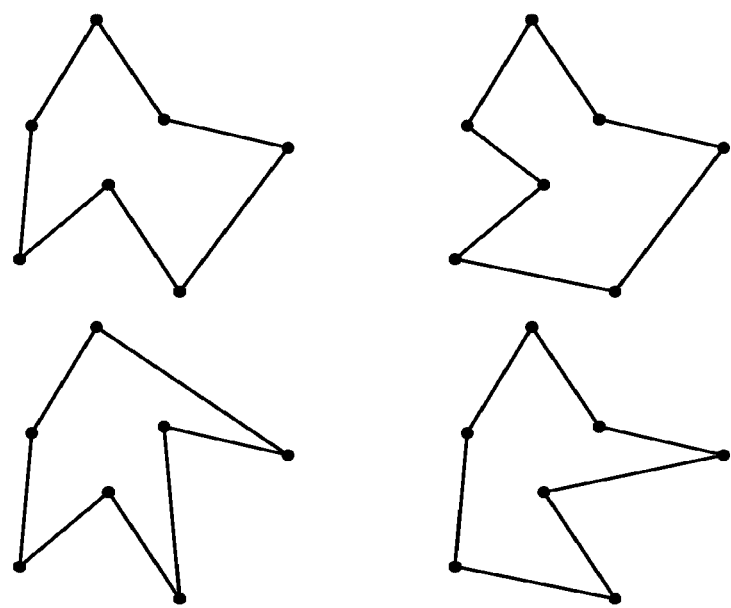
FIG. 5B, in accordance with some embodiments of the present disclosure, depicts concave polygons with connected vertices.
Figure 6A:
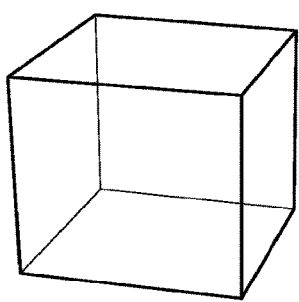
FIG. 6A, in accordance with some embodiments of the present disclosure, depicts a gridblock with no coincident vertices.
Figure 6B:
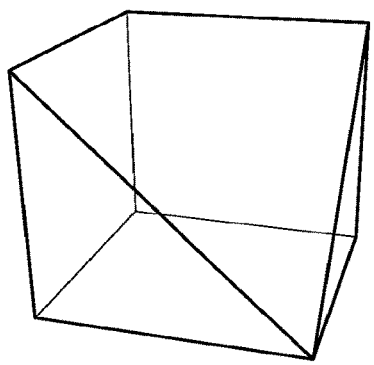
FIG. 6B, in accordance with some embodiments of the present disclosure, depicts a gridblock with one pair of coincident vertices.
Figure 6C:
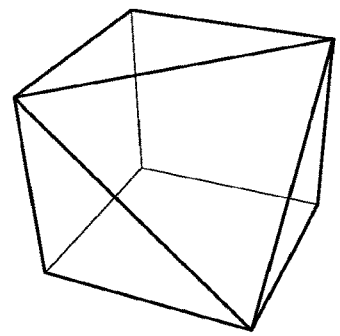
FIG. 6C, in accordance with some embodiments of the present disclosure, depicts a heptahedron gridblock.
Figure 6D:
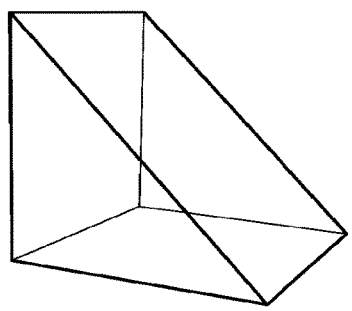
FIG. 6D, in accordance with some embodiments of the present disclosure, depicts a gridblock with two pairs of coincident vertices.
Figure 6E:
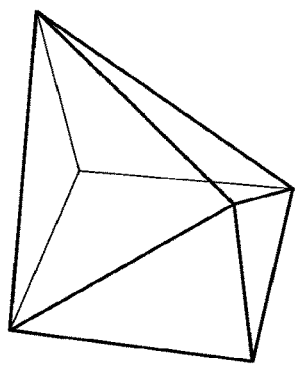
FIG. 6E, in accordance with some embodiments of the present disclosure, depicts a triangular prism gridblock.
Figure 6F:
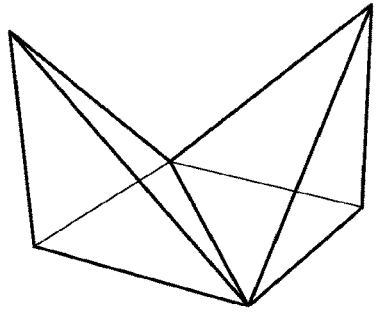
FIG. 6F, in accordance with some embodiments of the present disclosure, depicts an octahedral gridblock.
Figure 6G:
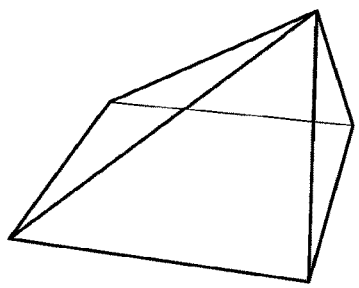
FIG. 6G, in accordance with some embodiments of the present disclosure, depicts a gridblock with three pairs of coincident vertices.
Figure 6H:
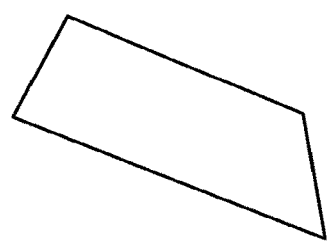
FIG. 6H, in accordance with some embodiments of the present disclosure, depicts a gridblock with four pairs of coincident vertices.
Figure 6I:
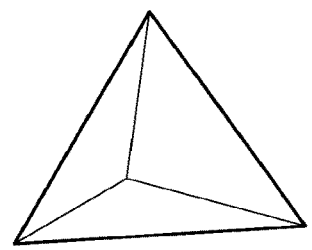
FIG. 6I, in accordance with some embodiments of the present disclosure, depicts a tetrahedron gridblock.

A unique feature of concave polygons is the connectivity between vertices, which is illustrated in FIGS. 5A-5B. For convex polygons, once the intersection points $v_1, v_2, \ldots,$ and $v_n$ are found, one way to arrange the points is to find a central point c, connect each vertex $v_i$ with c, and arrange the sequence of the points based on the angle between vi-c and any axis on the same plane. For convex polygons, once the vertices have been found, the connectivity between vertices can be easily determined as there is only one way to connect the vertices such that the final polygon is a simple polygon (top row of FIG. 5A). The other connecting sequences will result in complex polygons (bottom row of FIG. 5A), where the edges of the polygons cross over each other. The fracture segments in the EDFM do not have such geometry. For concave polygons, even if all vertices have been found, more than one polygon can be formed by connecting the vertices, as shown in FIG. 5B. While calculating the intersection points, the connectivity between the points may be recorded. After obtaining the coordinates of all vertices, the recorded connectivity may be used to determine the sequence of the points to connect them to a polygon. This approach may be used to accurately find each fracture-segment polygon.

Degeneracy of Block Geometry. Degeneracy is a unique feature of corner point grids. Degeneracy occurs when two or more vertices of a gridblock have the same coordinates. It is typically used in the modeling of erosion surfaces. Compared to an ordinary gridblock, a degenerate gridblock has less than eight vertices. FIGS. 6A-6I depict the possible variations of a cube due to degeneracy, where the shape of the gridblock ranges from a hexahedron with eight vertices to a tetrahedron with four vertices or a polygon with zero volume. Considering all these possibilities, the corner point block geometry can be even more challenging than that of unstructured grids for the calculation of matrix-fracture intersection. Several geometries in FIGS. 6A-6I are basic types of elements in unstructured grids, including a tetrahedron, pyramid, and triangular prism. Before calculating the intersection, an additional step for corner point grids is to detect the degeneracy of the gridblocks and merge vertices with the same coordinates.

Another issue brought by degeneracy is that a gridblock may have zero or close to zero volume. When a fracture intersects such gridblocks, the intersection may be ignored, and the fracture segment is not be generated. Otherwise, the small pore volume of the fracture segment will impact the simulation time step. In addition, similar to the way of handling matrix-matrix connections in many simulators, the connections between fracture segments across such gridblocks may be checked.

Algorithm for a Matrix-Fracture Intersection. A novel matrix-fracture intersection algorithm is developed to meet the requirement for practical application of the EDFM in general corner point grids. The development of the algorithm considers the challenges previously discussed, including non-cuboid block geometry, non-coplanar face points, and degeneracy. The new algorithm has the capability to handle the intersection between a general polyhedron and a polygon (convex or concave). Details of the algorithm are given in Appendix B. Compared to conventional studies of corner point grids, the disclosed algorithm makes it possible to find the geometry of fracture segments accurately, even along complex geological features such as faults and pinch-out layers. This algorithm can also be used for different types of complex fracture geometries, such as nonplanar fracture geometry and irregular fracture shape represented by arbitrary polygons.

The implemented algorithm has been tested on BedModel2, an open dataset in the MRST (https://www.sintetno/projectwebhnrst/moduleshnrst-coreidata-sets). The corner point grid of this model is shown in FIG. 7A. This grid has a large portion of gridblocks with degenerate geometry. Two fractures 17 are placed inside the reservoir, and the intersection between the matrix gridblocks and fractures are shown in FIG. 7B. The total number of matrix gridblocks is 299,700. The number of fracture segments is 10,705. The scale in the z-direction is 5.

Figure 9A:
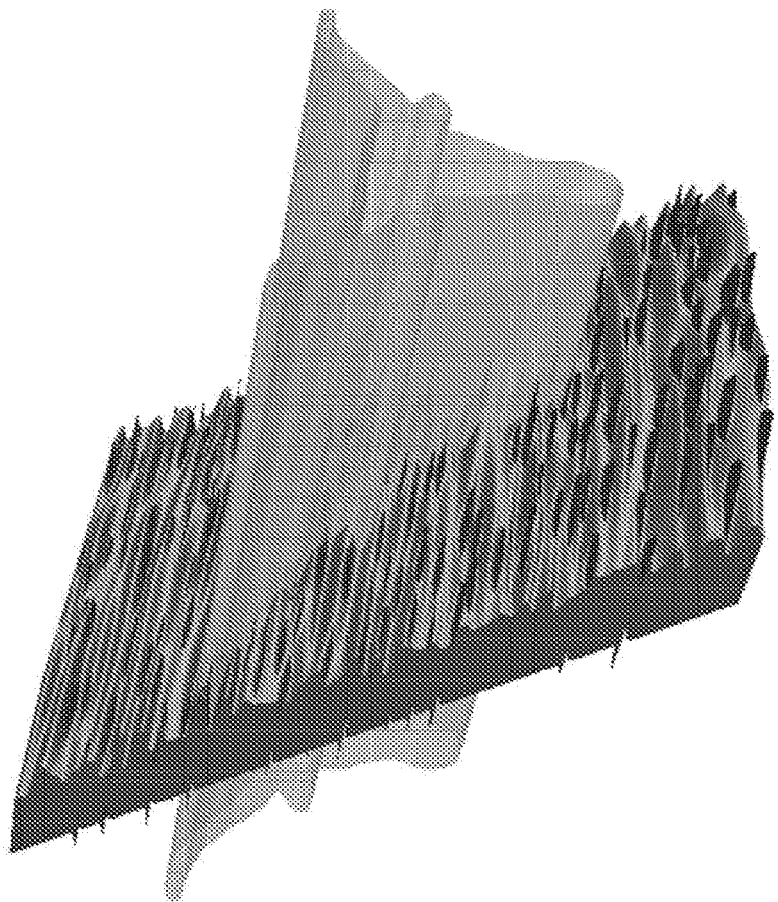
FIG. 9A, in accordance with some embodiments of the present disclosure, depicts a nonplanar fracture geometry.
Figure 9B:
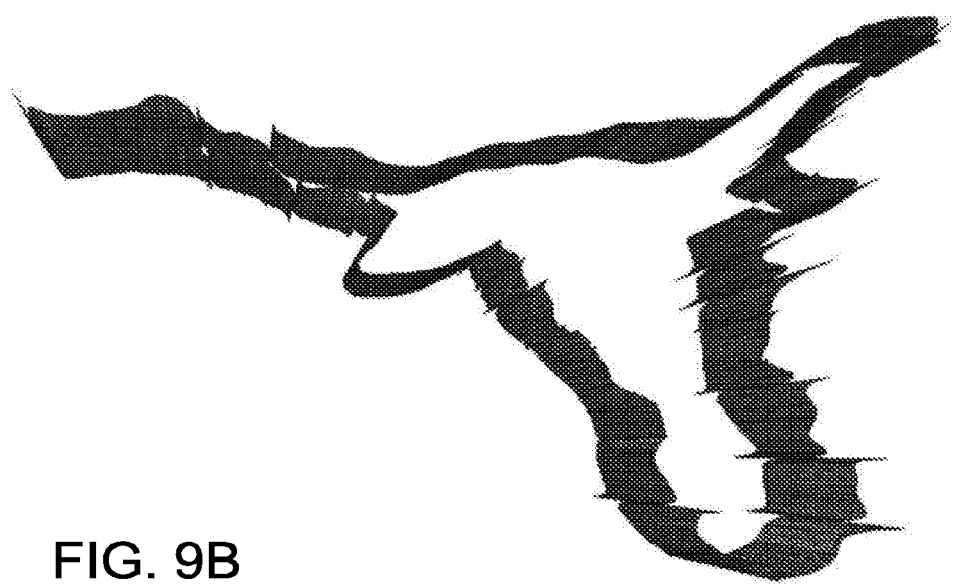
FIG. 9B, in accordance with some embodiments of the present disclosure, depicts fracture segments obtained from a geometrical calculation.

Another testing case uses a 300×600×20 corner point grid ("Flat UP1") from the IGEMS open dataset (https://www.nr.no/en/IGEMS), which a synthetic dataset from the Impact of Realistic Geologic Models on Simulation of CO2 Storage project. Similar to the BedModel2 dataset, this dataset is also one of the standard datasets in the MRST. The reservoir has a very complex geometry as shown in FIG. 8. The total number of matrix gridblocks is 3.6 million and the length in the z-direction is shown a hundred times the real size. A nonplanar fracture with a complex fracture geometry (as shown in FIG. 9A) is placed inside the reservoir, and the fracture is represented as 473 interconnected small fractures. In the vertical direction, the fracture fully penetrates the formation. After the geometrical calculation, 38,642 fracture segments are obtained in this example. The separate fracture segments are shown in FIG. 9B. This example demonstrates the generality of the proposed algorithm for handling large-scale corner point grids representing reservoirs with complex structures.

Connections Between Fracture Segments. The discretization of fractures in the EDFM is dependent on the discretization of the matrix. Correspondingly, the connections between fracture segments mimic the connections between their parent gridblocks. In a regular Cartesian grid, to find the Type 2 NNCs (connections between fracture segments within an individual fracture) for a given fracture segment, only the fracture segments in neighboring gridblocks need to be checked. In 3D problems, this means that at most six other fracture segments are considered (if the fracture is not crossing through the edges of the gridblock). However, in corner point grids, due to the existence of faults or pinched-out layers, the fracture segments in two gridblocks which are not neighbors in the (I, J, K) space may be connected, which greatly increases the complexity of connections between fracture segments.

Figure 10A:
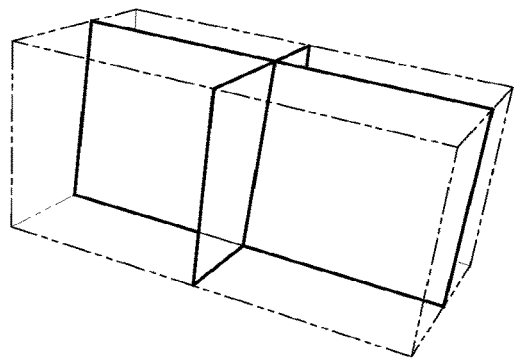
FIG. 10A, in accordance with some embodiments of the present disclosure, depicts gridblocks with connections between fracture segments.
Figure 10B:
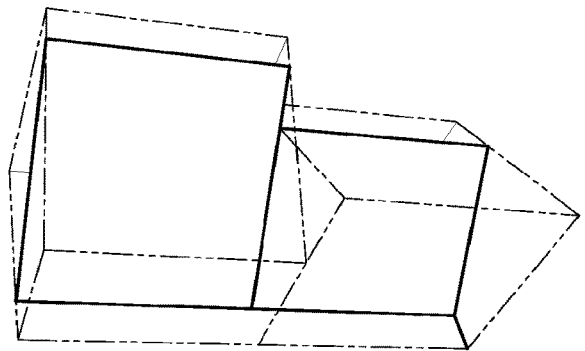
FIG. 10B, in accordance with some embodiments of the present disclosure, depicts gridblocks with the edges of fracture segments having a common vertex.
Figure 10C:
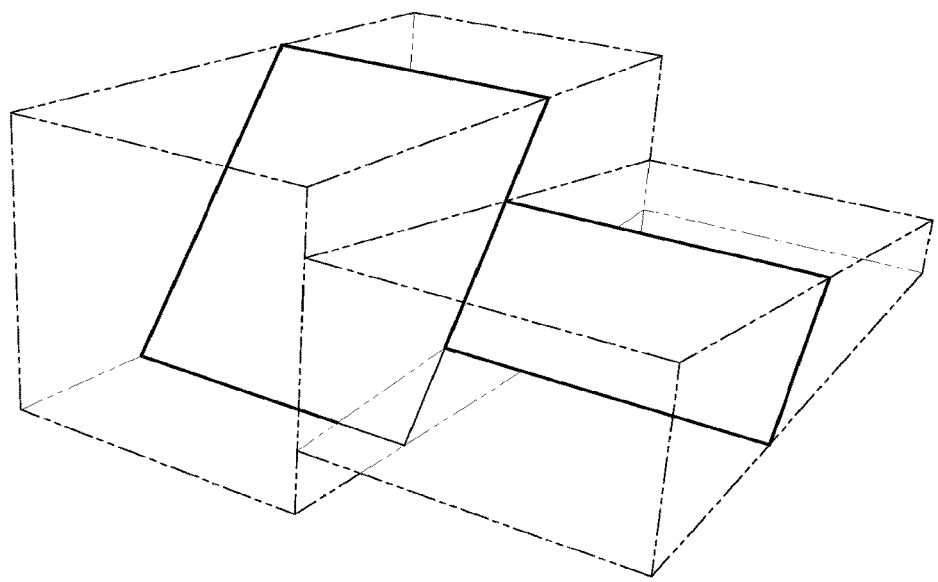
FIG. 10C, in accordance with some embodiments of the present disclosure, depicts gridblocks with the edges of fracture segments not having a common vertex.
Figure 10D:
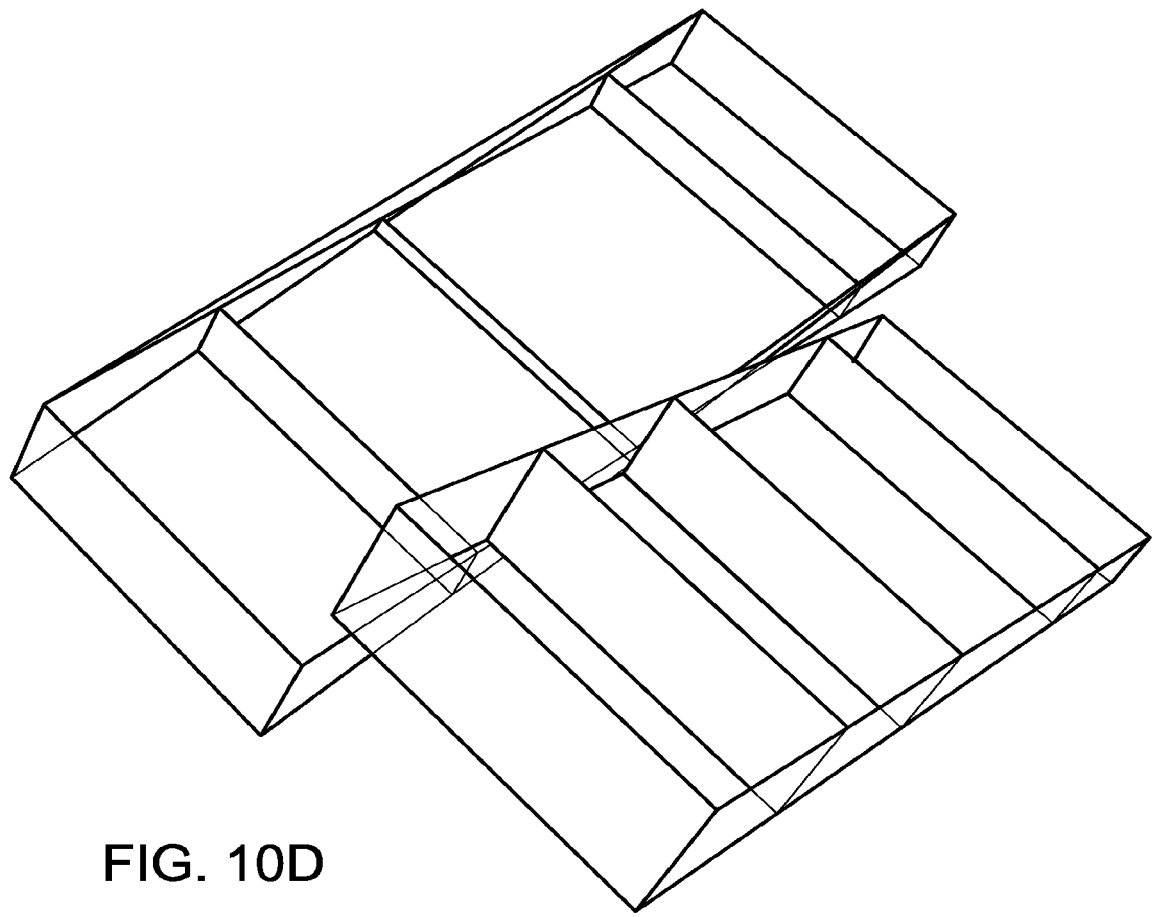
FIG. 10D, in accordance with some embodiments of the present disclosure, depicts gridblocks where fractures may or may not have overlapping edges.

In addition, to account for horizons across faults in corner-point grids, the corresponding faces between neighboring gridblocks may not overlap. In such cases, the common area between the two gridblocks is the overlapping area of two quadrilaterals. Correspondingly, for the EDFM, the common edge between the fracture segments is the overlapping edge between the polygons representing the fracture segments. The algorithm in Appendix B can give the accurate geometry of polygons representing the fracture segments on both sides of the fault, but the geometrical calculation required to find the common edges between fracture segments may be more complicated than that in Cartesian grids. A collinearity test and an overlapping calculation may need to be performed between the corresponding edges of the two polygons. FIGS. 10A-10D illustrate several possibilities of the connections between fracture segments in neighboring gridblocks, where the edges may completely overlap, partially overlap, or not overlap. The formulation of a transmissibility factor calculation between fracture segments may also be modified. Here the concept for calculating matrix-matrix connection transmissibility in 2D reservoir simulations is mimicked. FIG. 10A depicts a normal connection when the two corresponding gridblocks that contain the fracture segments have a matching face. FIGS. 10B-10D depict connections between fracture segments when the corresponding gridblocks have non-matching faces. The fracture segments are shaded. In FIG. 10A, the two fracture segments have a common edge; in FIG. 10B, the edges of two fracture segments have one common vertex; in FIG. 10C, the edges of fracture segments have no common vertex; in FIG. 10D, the two fracture segments may or may not have overlapping edge, depending on the location of the fracture.

Figure 11:
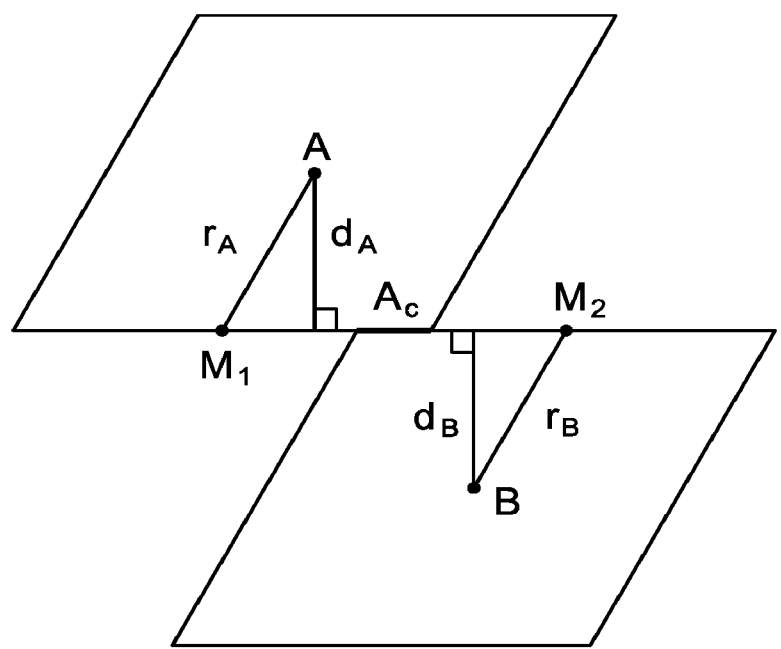
FIG. 11, in accordance with some embodiments of the present disclosure, depicts fracture segments with a partially overlapping edge.

FIG. 11 depicts a pair of fracture segments having a partially overlapping edge. For the two fracture segments shown in FIG. 11, the transmissibility factor between the two fracture segments (upper segment is A, lower segment is B) is $$T_{A-B} = \frac{T_A T_B}{T_A + T_B} \tag{5}$$

$$T_A = \frac{k_{fA} A_c d_A}{r_A^2}, T_B = \frac{k_{fB} A_c d_B}{r_B^2}.$$

In Equation (5), $k_{fA}$, and $k_{fB}$ are the permeabilities of fracture segments, $A_c$ is the contact area between two fracture segments, which can be calculated as the product of fracture width and the overlapping length between edges, $r_A$ is the distance from the centroid of fracture segment A to the midpoint of the edge of A, $d_A$ is the normal distance from the centroid of fracture segment A to the corresponding edge of A, and $r_B$ and $d_B$ have similar definitions as $r_A$ and $d_A$, respectively. Equation (5) uses a standard two-point flux approximation to evaluate the transmissibility, and the ratio of the overlapping edge length to the full edge length serves as a multiplier in the calculation of both $T_A$ and $T_B$. An accurate calculation of the overlapping edge length is important for the treatment of connections between fracture segments along faults.

Fracture Intersection. FIG. 12A and FIG. 12B depict sample fracture 16 intersections in a 3D view (upper) and 2D view (lower). At intersections, the fractures 16 can be divided into two subsegments. In FIG. 12A, all of the subsegments have similar dimensions. In FIG. 12B, there is high contrast between areas of the subsegments. A transmissibility factor is assigned between intersecting fracture segments to approximate the mass transfer at the fracture intersection. The transmissibility factor is calculated as $$T_{init} = \frac{T_1 T_2}{T_1 + T_2}, \tag{6a}$$

-continued $$T_1 = \frac{k_{f1}w_{f1}L_{int}}{d_{f1}}, T_2 = \frac{k_{f2}w_{f2}L_{int}}{d_{f2}}, \quad (6b)$$

where $L_{int}$ is the length of the intersection line, and $d_{f1}$, $d_{f2}$ are the weighted average of the normal distances from the centroids of the subsegments (on both sides) to the intersection line.

In FIGS. 12A and 12B, $$d_{f1} = \frac{\int_{S_1} x_n dS_1 + \int_{S_3} x_n dS_3}{S_1 + S_3} \quad (7)$$

$$d_{f2} = \frac{\int_{S_2} x_n dS_2 + \int_{S_4} x_n dS_4}{S_2 + S_4}, \quad (8)$$

where $dS_i$ is the area element and $S_i$ is the area of the fracture subsegment i. $x_n$ is the distance from the area element to the intersection line. It is not necessary to perform integrations for the average normal distance. Since the subsegments are polygonal, geometrical processing may be used to speed up the calculation.

Well Fracture Intersection. Well-fracture intersections are modeled by assigning an effective well index for the fracture segments that intersect the well trajectory, as $$WI_f = \frac{2\pi k_f w_f}{\ln\left(\frac{re}{rw}\right)}, re = 0.14\sqrt{L_s^2 + H_s^2}, \quad (9)$$

where $k_f$ is the fracture permeability, $w_f$ is the fracture aperture, is the length of the fracture segment, $H_s$ is the height of the fracture segment, re is the effective radius, and rw is the wellbore radius.

Figure 13A:
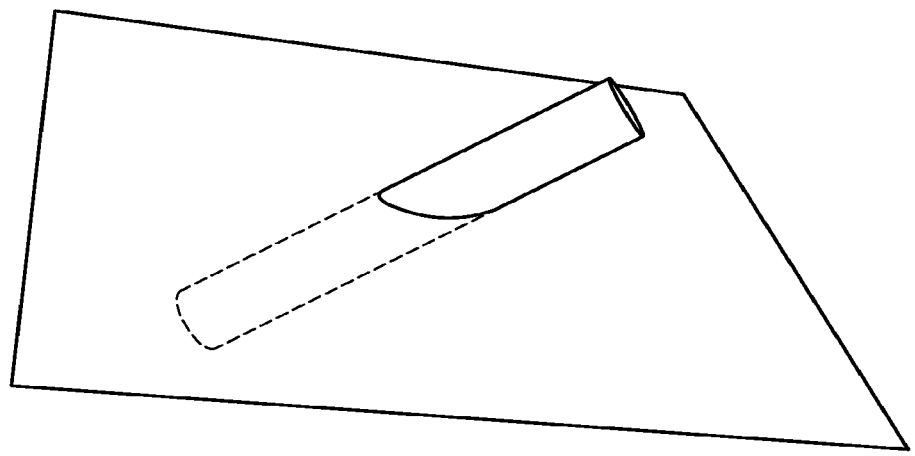
FIG. 13A, in accordance with some embodiments of the present disclosure, depicts a well-fracture intersection.

Equation (9) applies when the angle θ between the well axis and the plane of fracture segment is 90°. When the fracture plane is non-orthogonal or inclined, or when the well is slanted, θ may not maintain 90°, as shown in FIG. 13A. In such cases, the cross section of the wellbore is an ellipse instead of a circle. The semi-major axis and semi-minor axis of the ellipse are rw|sin(θ) and rw, respectively. Since $w_f$ is typically several orders of magnitude smaller than L, and $H_s$, the flow from the wellbore to the fracture segment can be treated as two-dimensional flow. In addition, as rw is typically much smaller than $L_s$ and $H_s$, at some distance from the wellbore, the flow is almost radial. The flow with an elliptical well cross section is almost identical to that with a circular well cross section, if the wellbore radius is replaced by ½(a+b), where a and b are the semi-major axis and semi-minor axis of the ellipse. Therefore, an effective well radius can be calculated as $$rw_\theta = \frac{1}{2}\left(\frac{rw}{\sin(\theta)} + rw\right) = \left(\frac{1}{2} + \frac{1}{2\sin(\theta)}\right)rw. \quad (10)$$

Substitution into Equation (9) gives $$WI_{f\theta} = \frac{2\pi k_f w_f}{\ln\left(\frac{re}{rw_\theta}\right)} = \frac{2\pi k_f w_f}{\ln\left(\frac{2\sin(\theta)}{1+\sin(\theta)}\frac{re}{rw}\right)}. \quad (11)$$

Equation (11) shows that if the influence of e is ignored, the value of the effective well index will be underestimated.

Figure 13B:
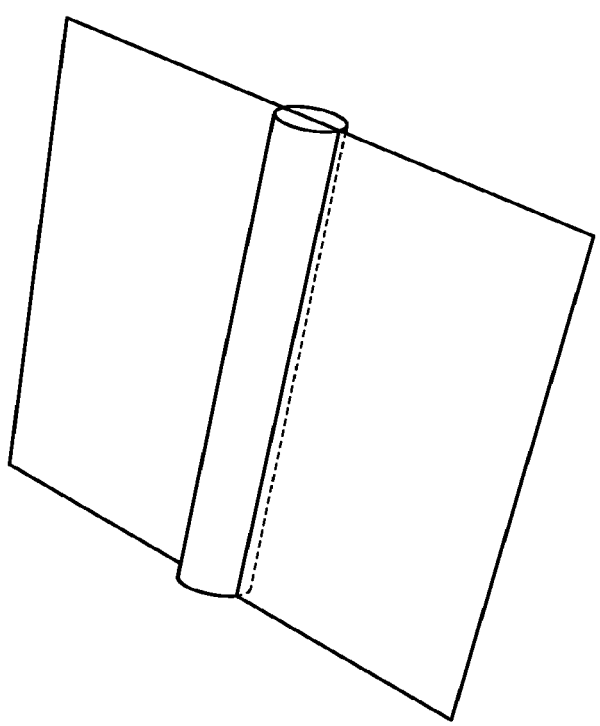
FIG. 13B, in accordance with some embodiments of the present disclosure, depicts a vertical well connected to a vertical fracture.

Another situation where the effective well index needs to be calculated is when a vertical well is fractured, as shown in FIG. 13B. In this case, the flow is almost linear, and the well index can be calculated as $$WI_f = \frac{k_f H_w w_f}{d_{s-w}}, \quad (12)$$

where $H_w$ is the height of the well in the fracture segment and $d_{s-w}$ is the average normal distance from the fracture segment to the wellbore axis, which can be easily calculated through integration or geometrical method.

III. Modeling of Complex Fracture Geometries

Nonplanar Fracture Geometry. Mathematically, the preprocessor calculates the intersection between a plane (fracture) and a cuboid (matrix cell). To account for the complexity in fracture shape, the EDFM may be extended to handle nonplanar fracture shapes by discretizing a nonplanar fracture into several interconnected planar fracture segments. The connections between these planar fracture segments may be treated as fracture intersections.

For two intersecting fracture segments, if the two subsegments have small areas (as depicted in FIG. 12B, $S_3 \rightarrow 0$, $S_4 \rightarrow 0$), the transmissibility factor between the fracture segments is primarily determined by subsegments with larger areas. In Equation 7, we will have $$d_{f1} = \frac{\int_{S_1} x_n dS_1}{S_1}, d_{f2} = \frac{\int_{S_2} x_n dS_2}{S_2}, \quad (13)$$

The formula for this intersecting transmissibility factor calculation ($T_{int}$) has the same form as that used for two fracture segments in an individual fracture (Equation 5), with the permeability and the aperture of the two intersecting fractures being the same. This approach is used to model nonplanar fractures. FIG. 14 depicts how EDFM embodiments handle nonplanar fractures 18. The fracture 18 is discretized into six interconnected planar fractures. For each intersection, the ratios of L1/L3 and L2/L4 should be high enough to eliminate the influence of the small subsegments. In an exemplary embodiment, the ratios are set as 100.

Fractures with Variable Aperture. A fracture with variable apertures is modeled with the EDFM by discretizing it into connecting segments and assigning each segment an "average aperture" ($\overline{w_f}$) and "effective permeability" ($k_{f,eff}$). FIG. 15 shows a 2D case where a fracture 20 segment has a length of $L_s$ with variable aperture and x is the distance from a cross section to one end of the fracture segment. The aperture is a function of x. The total volume of the segment is $$V_{seg} = H\int_0^{L_s} w_f(x)dx, \quad (14)$$

where H is the height of the fracture segment. The average aperture to calculate the volume should be $$\overline{w_f} = V_{seg}/HL_s = \frac{1}{L_s}\int_0^{L_s} w_f(x)dx. \quad (15)$$

For transmissibility calculation, assuming the cubic law for fracture conductivity, $$C_f(x) = k_f(x)w_f(x) = \lambda w_f^3(x), \quad (16)$$

where λ is 1/12 for smooth fracture surfaces and λ<1/12 for coarse fracture surfaces. For the fluid flow in fractures, based on Darcy's law, $$Q_j = HC_f(x)\lambda_j \frac{dP}{dx}, \quad (17)$$

where $Q_j$ is flow rate of phase j and $\lambda_j$ is the relative mobility of phase j. For each fracture segment, assuming constant $Q_j$, the pressure drop along the fracture segment is $$\Delta p = \int_0^{L_s} \frac{Q_j}{HC_f(x)} dx. \quad (18)$$

To keep the pressure drop constant between both ends of the segments, an effective fracture conductivity can be defined which satisfies the following equation:

$$\int_0^{L_s} \frac{Q_j}{HC_f(x)} dx = \int_0^{L_s} \frac{Q_j}{HC_f^{eff}(x)} dx, \quad (19)$$

which gives $$C_f^{eff} = \frac{L_s}{\int_0^{L_s} \frac{dx}{C_f(x)}} = \frac{L_s}{\int_0^{L_s} \frac{dx}{\lambda w_f^3(x)}}. \quad (20)$$

Since the fracture conductivity is the product of fracture aperture and fracture permeability, if $\overline{w_f}$ is used for the whole fracture segment, an effective fracture permeability $k_{f,eff}$ is required to calculate the conductivity:

$$k_{f,eff} = C_f^{eff}/\overline{w_f} = \frac{L_s^2}{\left(\int_0^{L_s} w_f(x)dx\right)\left(\int_0^{L_s} \frac{dx}{\lambda w_f^3(x)}\right)}. \quad (21)$$

Similarly, assuming constant fracture permeability but varying aperture, the effective fracture permeability should be $$k_{f,eff} = \frac{L_s^2}{\left(\int_0^{L_s} w_f(x)dx\right)\left(\int_0^{L_s} \frac{dx}{k_f w_f(x)}\right)}. \quad (22)$$

Special Handling of Extra Small Fracture Segments. In EDFM embodiments, the discretization of fractures by cell boundaries may generate some fracture segments with extremely small volumes. This happens frequently when modeling complex fracture geometries, where a large number of small fractures are used to represent the nonplanar shape and variation in aperture. These small control volumes may cause problems in preconditioning and they limit the simulation time step to an unreasonable value. Simply eliminating these segments may cause the loss of connectivity as depicted in FIGS. 16A and 16B. Lines 22 represent the fracture segments. In both FIGS. 16A and 16B, removing the fracture segment in Cell B will lead to loss of connectivity. For a fracture segment with extra small volume, if N denotes the number of NNCs related to this fracture segment, $C_1, C_2 \ldots C_N$ denotes the cells connected to this segment by NNC, and $T_1, T_2, \ldots T_N$ denotes the NNC transmissibility factor related to these connections, then the small segment can be eliminated as follows:

a) Remove the cell for this segment in the computational domain and eliminate all NNCs related to this cell.
b) Add N(N−1)/2 connections for any pair of cells in $c_1$, $C_2, \ldots C_N$ and the transmissibility between $c_i$ and $c_j$ is $$T_{i,j} = \frac{T_i T_j}{\sum_{k=1}^{N} T_k}. \quad (23)$$

This special case method eliminates the small control volumes while keeping the appropriate connectivity. However, for multiphase flow an approximation is provided as only the phase independent part of transmissibility is considered in the transformation. This method may also cause loss of fracture-well connection if applied for fracture segments with well intersections. Since this method ignores the volume of the small fracture segments, it is most applicable when a very high pore volume contrast (e.g. 1000) exists between fracture cells.

IV. Fracture Transient Flow

An advantage of the disclosed embodiments is that minimal matrix grid adjustment needs to be performed around the fractures. In general, the gridblock size around the fractures can be large to minimize the memory usage and obtain a high computational efficiency. This is adequate for long-term production forecasting. However, the simulation of transient flow (e.g. with a coarse grid around fractures) requires adjustment in order to capture the pressure variation in the vicinity of the fractures.

Figure 17:
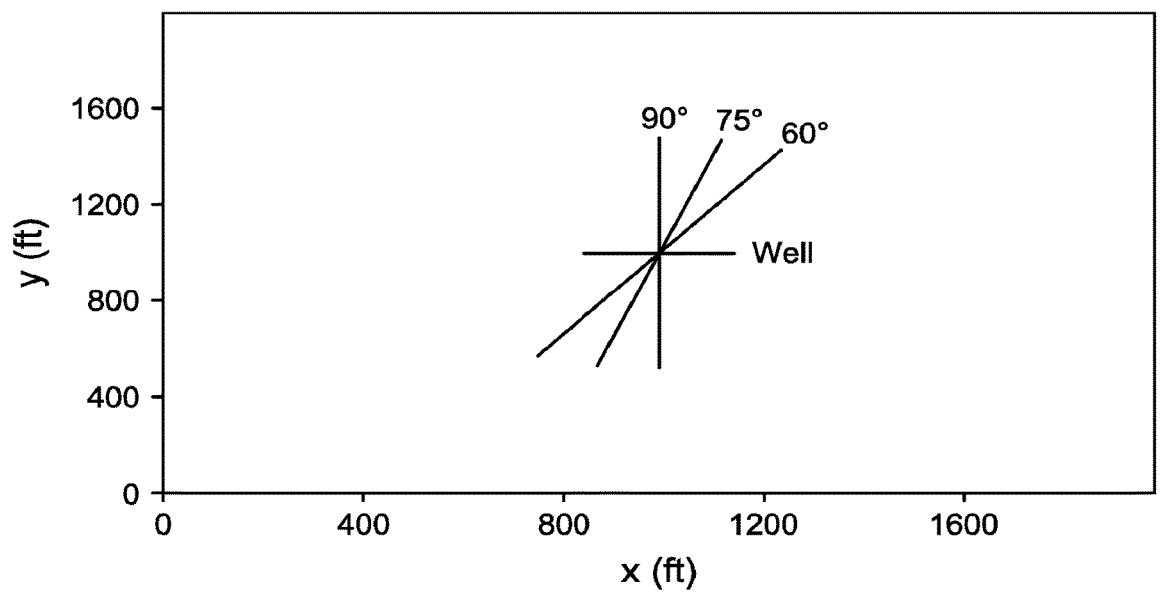
FIG. 17 depicts a plot of reservoir dimensions for a simulation performed in accordance with some embodiments of the present disclosure.

Simulation results with coarse grids. FIG. 17 depicts the reservoir dimensions, well location, and fracture orientations for an EDFM simulation of fracture transient flow. A black-oil commercial simulator, in combination with an EDFM embodiment, was used to perform the simulation. A 99×99×1 Cartesian grid was used for the matrix. The gridblock sizes in both the x- and y-directions are 20 ft. Single-phase (oil) flow is simulated, and the initial oil saturation is assumed to be 1.0. The horizontal producer well is placed in the center of the reservoir, producing with a constant oil rate. A vertical hydraulic fracture is placed inside the reservoir. In this simulation, the angle between the fracture plane and the wellbore is altered from 60° to 75° and 90°, as shown in FIG. 17. The fracture length is kept constant. Table 1 summarizes some key reservoir and fracture parameters for this simulation.

TABLE 1

| Parameter | Value | Unit |
| --- | --- | --- |
| Reservoir permeability | 0.3 | md |
| Reservoir porosity | 12% | — |
| Initial reservoir pressure | 4500 | Psi |
| Reservoir thickness | 80 | ft |
| Rock compressibility | $1 \times 10^{-6}$ | $psi^{-1}$ |
| Oil compressibility | $3 \times 10^{-6}$ | $psi^{-1}$ |
| Oil formation volume factor | 1.2 | rb/STB |
| Oil viscosity | 1.0 | cp |
| Oil rate | 10 | STB/day |
| Fracture length | 980 | ft |

TABLE 1-continued

| Parameter | Value | Unit |
| --- | --- | --- |
| Fracture width | 0.01 | ft |
| Fracture permeability | 1 × 10⁶ | md |
| Wellbore radius | 0.25 | ft |

Figure 18:
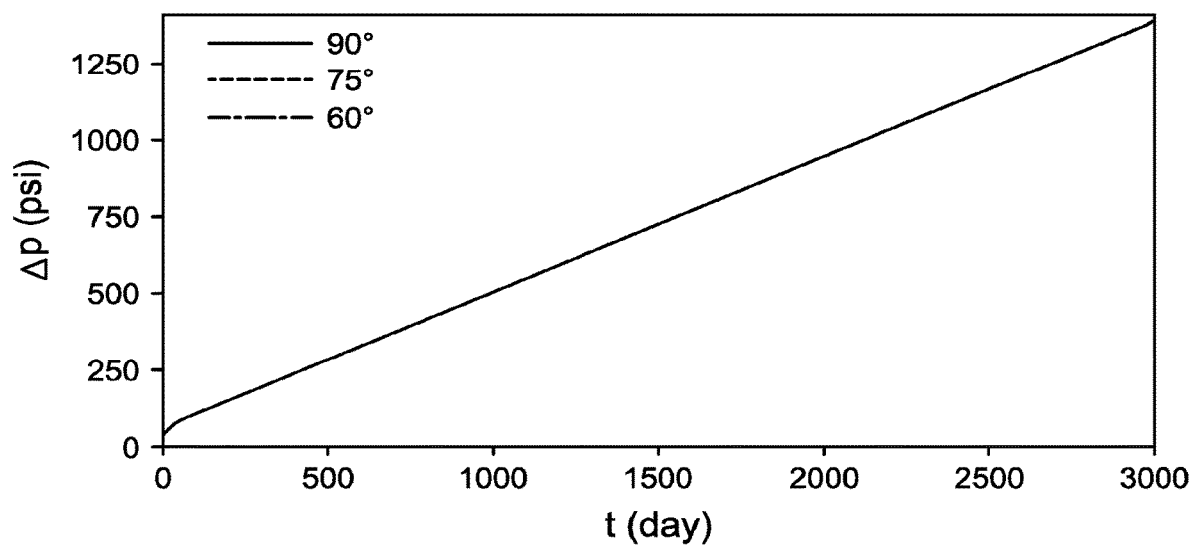
FIG. 18 depicts a plot comparison of long-term pressure difference using the plot of FIG. 17 in accordance with some embodiments of the present disclosure.

FIG. 18 depicts the simulation results. The x-axis is the time, and the y-axis represents the pressure difference (also known as pressure drop). The pressure difference is defined as $$\Delta p = p_i - p_{wf}, \quad (24)$$

where $p_i$ is the initial reservoir pressure, and $p_{wf}$ is the well bottomhole pressure. It can be observed that for all three different fracture angles, similar results are obtained, which is expected as the fracture properties are the same.

The results in FIG. 18 show that using the EDFM formulation with the grid in FIG. 17 can give a reliable result when a long-term prediction is desired. However, the accuracy of the formulation for simulating transient flow is likely to differ. In pressure transient analysis, attention is generally paid to the variation of the well bottomhole pressure in a relatively short period of time, and the log-log plot of pressure difference versus time is commonly used. Both the time and the pressure difference can be shown in their dimensionless forms. The dimensionless time is defined as $$t_D = \frac{0.0002637 k_m t}{\phi \mu c_t x_f^2}, \quad (25)$$

where $k_m$ is the matrix permeability, t is time, $\phi$ is porosity, $\mu$ is fluid viscosity, $c_t$ is total compressibility, and $x_f$ is the fracture half-length. The dimensionless pressure difference is defined as $$\Delta p_D = \frac{k_m h \Delta p}{141.2 q B \mu}, \quad (26)$$

where h is reservoir thickness, q is the fluid production rate, and B is the formation volume factor.

Figure 19:
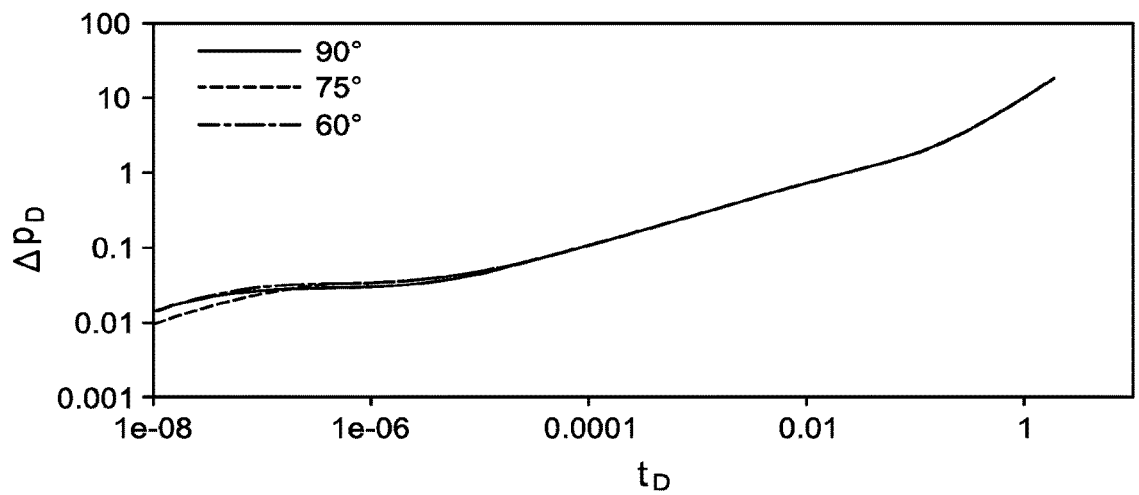
FIG. 19 depicts a log-log plot comparison of dimensionless pressure difference prediction with different fracture angles using the plot of FIG. 17 in accordance with some embodiments of the present disclosure.
Figure 20A:
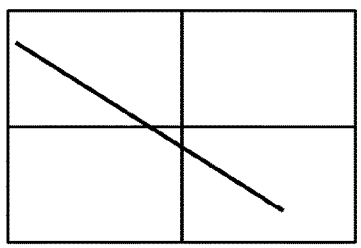
FIG. 20 depicts a non-orthogonal fracture placed in a coarse grid with various levels of local grid refinement performed in accordance with some embodiments of the present disclosure.
Figure 20B:
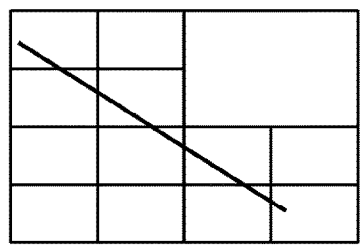
Figure 20C:
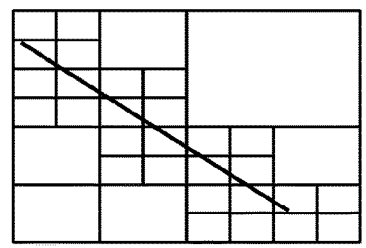
Figure 20D:
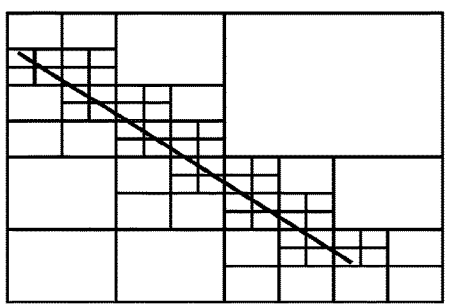
Figure 20E:
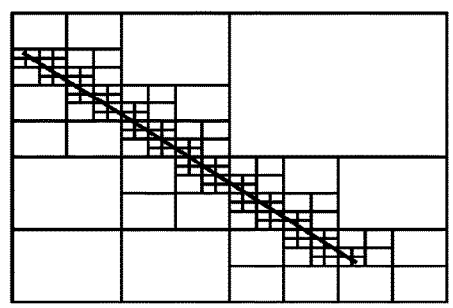

FIG. 19 depicts a comparison of dimensionless pressure difference predicted by the EDFM formulation with different fracture angles in the log-log plot. The x-axis is dimensionless time, and the y-axis is dimensionless pressure difference. As can be seen, all three cases obtain similar results for $t_D > 0.0001$. However, at the very early time ($t_D < 0.0001$), the EDFM predicts different results for different fracture angles. As the fracture width and fracture conductivity are fixed, the early-time fracture transient flow should not be influenced by the fracture angle. The reason why the EDFM is not accurately capturing the early-time transient behaviors is that at the early time, the pressure variation around the hydraulic fractures is typically large, especially in the direction normal to the fracture plane, and the use of coarse matrix gridblocks around the fractures presents difficulty in representing the pressure gradient. Therefore, reduction of the gridblock sizes near the fractures will improve the simulation accuracy.

Methodology to improve simulation accuracy of near-fracture flow. As discussed above, having smaller gridblock sizes around the fractures may help better capture the large pressure gradient around the fractures. It also improves the accuracy of the EDFM in other aspects. For example, in the derivation of the matrix-fracture transmissibility factor, a uniform pressure gradient assumption is made. This is a good approximation at locations close to the fractures. When the sizes of the gridblocks close to the fracture are large, the pressure within the gridblocks may deviate far from the "linear pressure distribution" assumption, which introduces some errors. As the existence of the well can also affect the transmissibility evaluation between wellblocks and their neighboring blocks, the existence of fractures can have a similar impact, and the influence of this effect can also be reduced by decreasing the sizes of the gridblocks around the fractures. Embodiments of this disclosure provide a nested local grid refinement (LGR) approach to overcome these challenges.

FIG. 20 depicts the methodology of EDFM nested LGR embodiments of this disclosure. In FIG. 20A a non-orthogonal fracture is placed in a coarse matrix grid with four blocks. The sizes of the gridblocks are quite large, and the coarse grid may pose difficulty capturing the pressure variation around the fractures. In FIG. 20B, the gridblocks intersected by the fractures are identified, and LGR is performed for these gridblocks. In FIG. 20B, a 2×2 refinement is used for purpose of the illustration. After the refinement, the fracture now has intersections with the subgridblocks, which have a smaller gridblock size. However, it is probable that the new gridblock sizes do not meet the requirement for accurately simulating near-fracture flow either. Therefore, in FIG. 20C, the gridblocks intersected by the fractures are refined again, creating a Level-2 refinement. Here the level of LGR is defined as the maximum number of times that a coarse gridblock may be refined. By repeating this process, the sizes of the gridblocks around the fractures can be further reduced. FIG. 20D and FIG. 20E respectively show the Level-3 and Level-4 refinements. In FIG. 20E, the size of the gridblocks intersected by the fracture are 1/16 the size of the original gridblock size, and the sizes of the gridblocks gradually increase in the direction normal to the fracture plane. In general, refining only the gridblocks intersected by the fractures may not be sufficient. Some gridblocks not intersected by the fractures may be in very close proximity to the fracture polygon and thus as important as those intersected by the fractures. Also, having a larger refined area may help in the improvement of simulation accuracy.

Automatic refinement around complex fractures. As discussed above, a smaller gridblock size around the fractures can improve the simulation accuracy for fracture transient flow. However, a manual refinement process may take a great deal of time and can be prone to error. As the refinement of gridblocks depends primarily on geometrical information, such as gridblock sizes and gridblock-fracture intersections, an automatic refinement workflow is disclosed herein, making use of the geometrical calculation results in the EDFM formulations.

Figure 21:
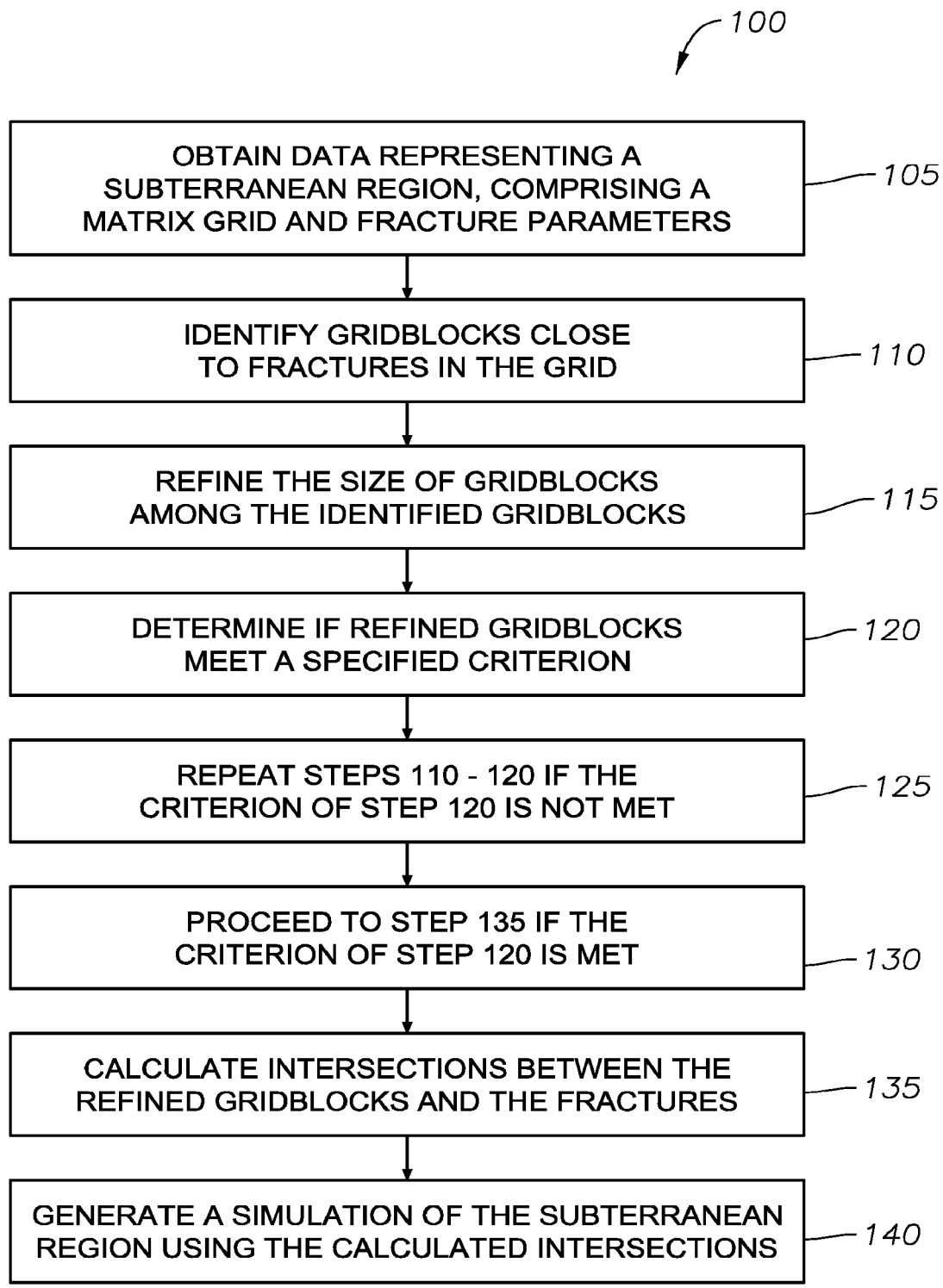
FIG. 21, in accordance with some embodiments of the present disclosure, depicts a flow chart illustrating a process for simulating a subterranean region having fracture geometries via an automatic refinement process.

In accordance with some embodiments, FIG. 21 is a flow chart illustrating a process 100 for simulating a subterranean region having fracture geometries via an automatic refinement process. At step 105, data representing a subterranean region is obtained, the data comprising a matrix grid and fracture parameters. As disclosed herein, the data set may be obtained as the output generated by a conventional commercial simulator or attained by other means as known in the art, such as formation evaluation logging techniques, seismic surveys, cross-well surveys, etc. At step 110, gridblocks close to fractures in the matrix grid are identified. Matrix gridblocks intersected by or close to the fractures are selected. At step 115, the size of gridblocks among the identified matrix gridblocks is refined. At step 120, a determination is made whether the refined gridblocks meet a specified criterion. At step 125, steps 110-120 are repeated if the criterion of step 120 is not met. If the sizes of the gridblocks do not meet the criterion, a higher level of refinement is performed as disclosed herein. At step 130, step 135 is applied if the criterion of step 120 is met. At step 135, intersections between the refined gridblocks and the fractures are calculated. At step 140, the calculated intersections are used for generation of a simulation of the subterranean region. Once the criterion of step 120 is met and no further refinement is required, the workflow modifies the EDFM file and reservoir simulator input file, and the EDFM transmissibilities are calculated based on the final grid. This is performed in accordance with the disclosed techniques.

Regarding the criterion at step 120 in FIG. 21, two parameters are used to control the automatic refinement process, $L_{final}$ and $r_{L/d,critical}$. $L_{final}$ is a defined gridblock length in the direction normal to the fracture plane for gridblocks that have direct contact with the fractures. The value of $L_{final}$ mainly influences the final level of refinement. It can be chosen to be as small as the fracture width. Practically, using the radius of investigation concept, $$L_{final} \propto \sqrt{\frac{k_m \Delta t_c}{\phi \mu c_t}}, \quad (27)$$

where $\Delta t_c$ is the characteristic time step size for early time simulation. $r_{L/d,critical}$ is a dimensionless number. The value of $r_{L/d,critical}$ may be a difficult ratio to predict ahead of time. It depends on gridblock size and the distance from the gridblock to the fracture. In general, the smaller the ratio, the more grids that will be refined. For gridblocks around a fracture (but not intersected by the fracture), a parameter $r_{L/d}$ is defined for each gridblock as $$r_{L/d} = \frac{L_n}{d_{g-f}}, \quad (28)$$

where $L_n$ is the length of the gridblock, which is usually measured in the direction normal to the fracture plane, and $d_{g-f}$ is the minimum distance from the gridblock to the fracture. A gridblock intersected by the fracture will be refined if $$L_n > L_{final}. \quad (29)$$

A gridblock not intersected by the fracture will be refilled if $$r_{L/d} > r_{L/d,critical} \quad (30)$$

and $$L_n > L_{final}. \quad (31)$$

A smaller $L_{final}$ will result in more levels of refinement, and a smaller $r_{L/d,critical}$ will result in a larger refined area around the fracture. Equations (29)-(31) apply for each fracture of interest. If a matrix gridblock is in the vicinity of several fractures, the highest level of refinement required by the fractures is performed. In some embodiments, the value for $L_{final}$ and/or $r_{L/d,critical}$ may be defined by the user, or the preprocessor may be programed accordingly to define the value.

Figure 22A:
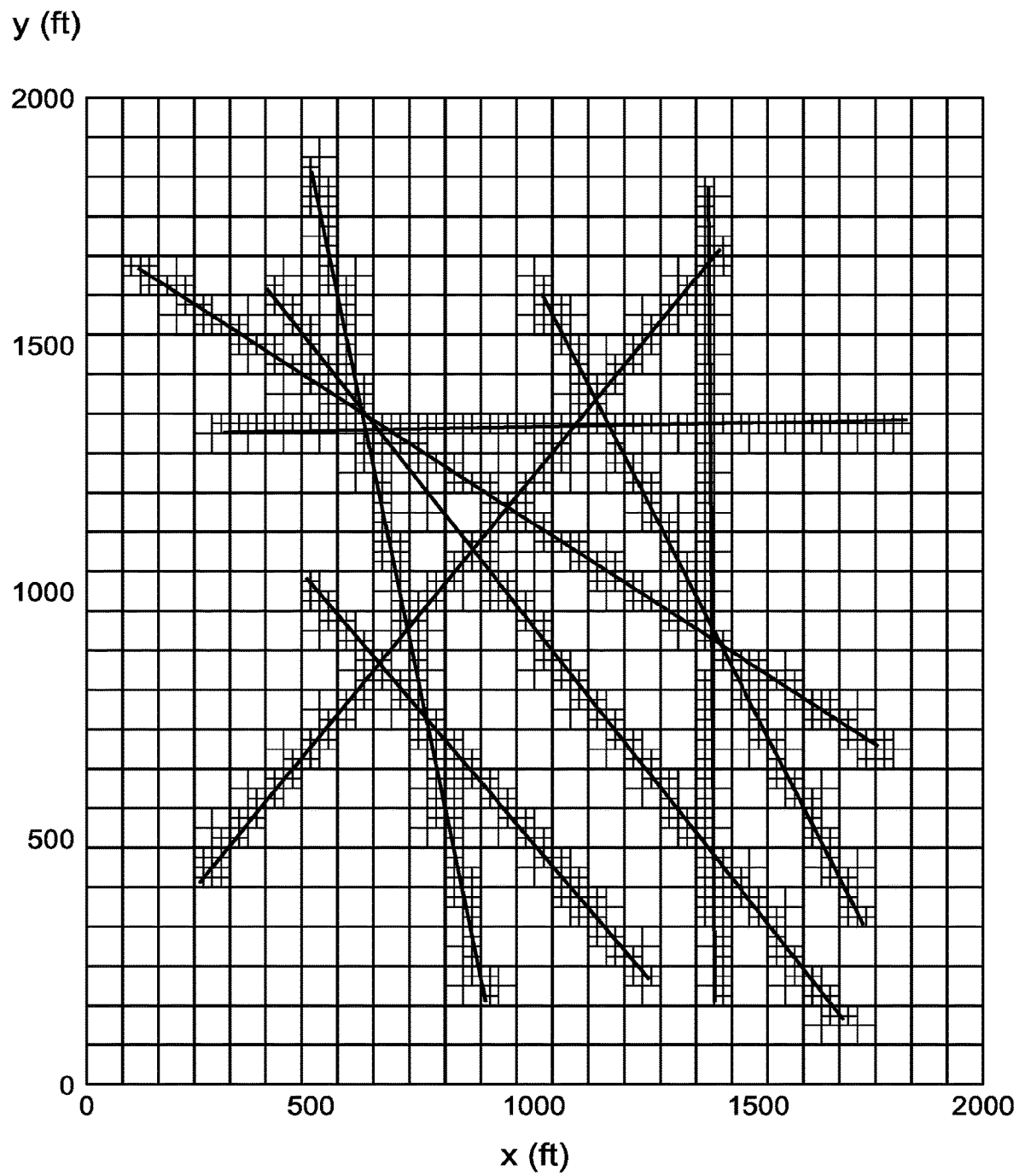
FIGS. 22A-22B depict final grids obtained from an automatic refinement process using different parameters in accordance with some embodiments of the present disclosure.
Figure 22B:
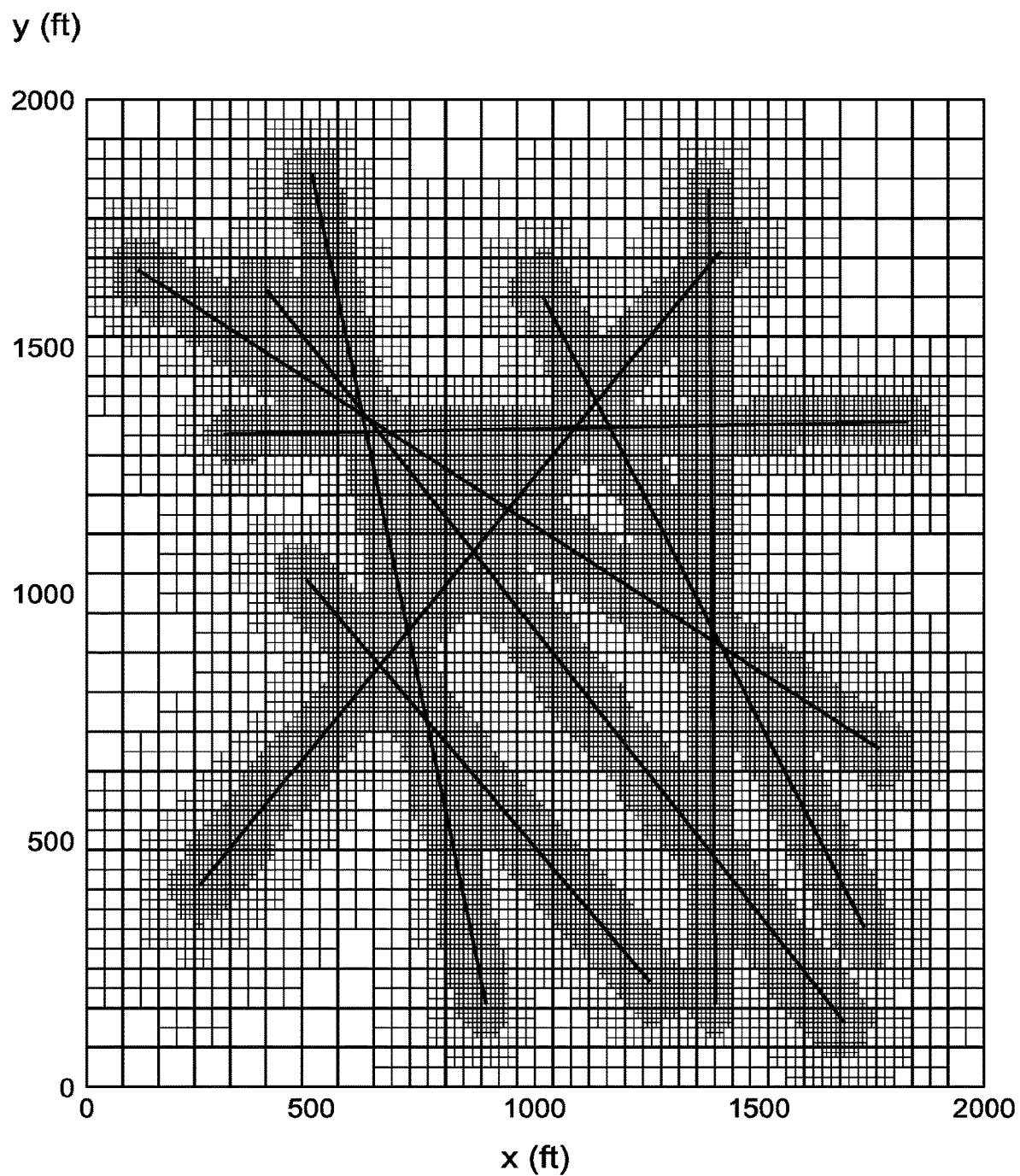
Figure 22C:
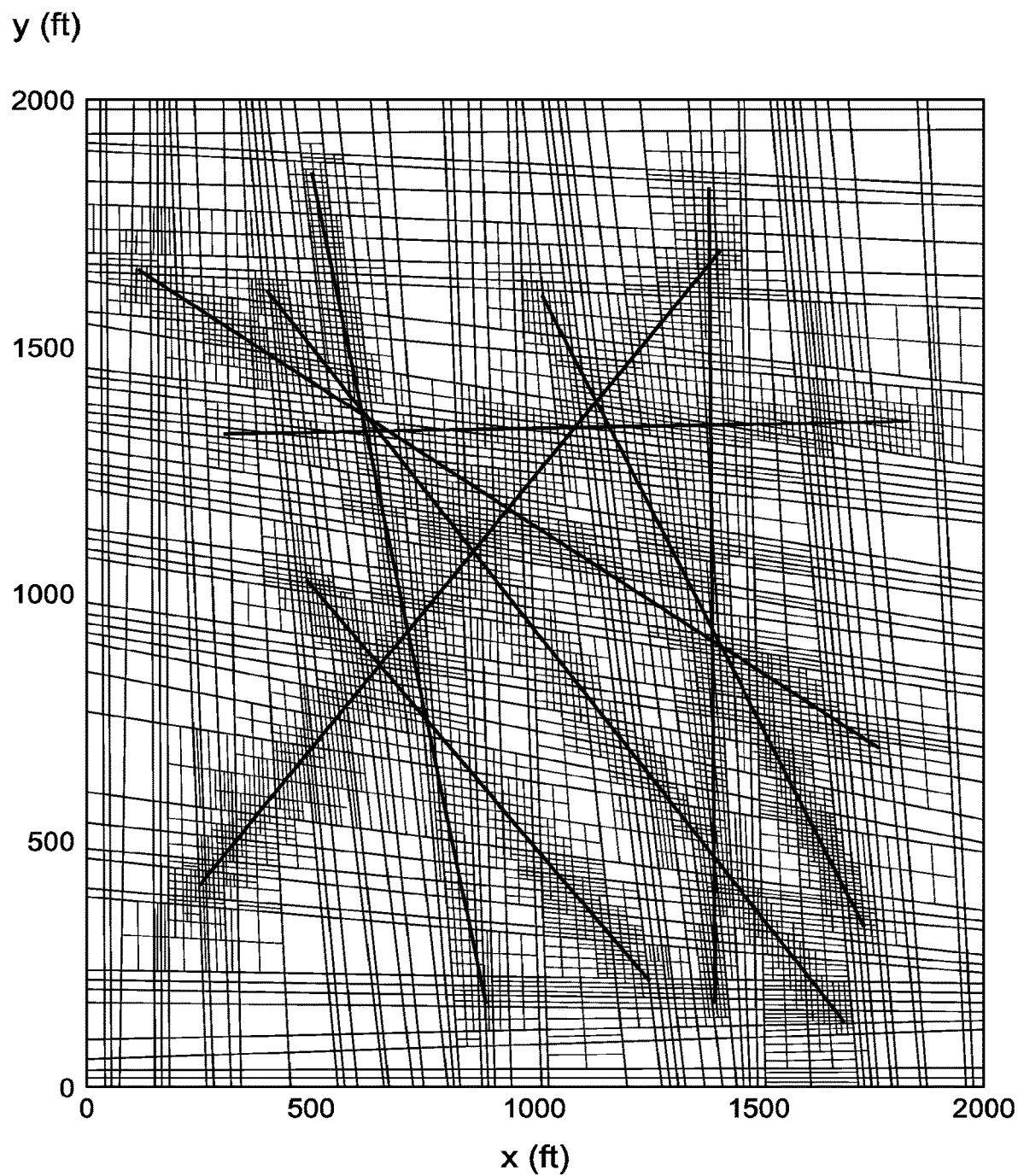
FIG. 22C depicts a final grid obtained from an automatic refinement process applied to a corner-point grid in accordance with some embodiments of the present disclosure.

FIGS. 22A-22C depict the final grids obtained from the automatic nested LGR process for a complex fracture network with eight fractures. A value of 1.0 ft is used for $L_{final}$, and different values are used for $r_{L/d,critical}$. In FIG. 22A $r_{L/d,critical}$=5.0. In FIG. 22B $r_{L/d,critical}$=0.2. As can be seen from FIG. 22A and FIG. 22B, a smaller value of $r_{L/d,critical}$ results in a larger refined region, and correspondingly more refinement in each iteration. The refinement process can also be used for corner-point grids, as depicted in FIG. 22C, with $r_{L/d,critical}$=1.0.

Analysis on the number of gridblocks. As the automatic grid refinement procedure can greatly reduce the sizes of the gridblocks around fractures, it also increases the total number of gridblocks. A two-dimensional example with non-orthogonal fractures is now considered. As the total length of the fractures is fixed, the number of fracture segments (the same as the number of matrix gridblocks intersected by the fractures) at iteration i is inversely proportional to the average size of the gridblocks containing the fractures:

$$N_{seg,i} = \frac{C_1}{L_{i-1}}, \quad (32)$$

where $C_1$ is a constant related to the total fracture length and fracture orientation, and $L_i$ represents the characteristic size of gridblocks around the fractures after iteration i. Initially, $$N_{seg,1} = \frac{C_1}{L_{initial}}, \quad (33)$$

where $L_{initial}$ is the initial size of the gridblocks (the typical size of coarse gridblocks).

Similarly, the number of gridblocks refined in each iteration is roughly proportional to the number of gridblocks intersected by the fractures (the same as the number of fracture segments). Therefore, $$N_{refined,i} = \frac{C_2}{L_{i-1}}, \quad (34)$$

where $N_{refined,i}$ is the number of gridblocks refined in the $i^{th}$ iteration, and $C_2$ is a constant determined by $r_{L/d,critical}$. For the first iteration in the automatic refinement process, $$N_{refined,1} = \frac{C_2}{L_{initial}}. \quad (35)$$

If each gridblock is uniformly refined into n×n subgridblocks, $$L_i = \frac{L_{initial}}{n^i}. \quad (36)$$

Therefore, $$N_{refined,i} = \frac{C_2}{L_{initial}} n^{i-1}. \quad (37)$$

The increase in the total number of gridblocks in Iteration i is $$N_{added,i} = N_{refined,i}(n^2 - 1). \tag{38}$$

Define $r_L$ as the ratio of the initial gridblock size to the final gridblock size around the fracture, $$r_L = \frac{L_{initial}}{L_{final}}. \tag{39}$$

The maximum level of refinement required is $$N_{lgr\text{-}level} = \log_n r_L, \tag{40}$$

which is also the required number of iterations. Therefore, the final number of gridblocks is $$\begin{aligned} N_m &= N_{m,initial} + \sum_{i=1}^{N_{lgr\text{-}level}} N_{added,i} \\ &= N_{m,initial} + \frac{C_2}{L_{initial}} \sum_{i=1}^{N_{lgr\text{-}level}} n^{i-1}(n^2 - 1) \\ &= N_{m,initial} + \frac{C_2}{L_{initial}}(n+1)\left(n^{N_{lgr\text{-}level}} - 1\right) \\ &= N_{m,initial} + N_{refined,i}(n+1)(r_L - 1) \end{aligned} \tag{41}$$

Using Equations (33) and (35), $$N_{refined,1} = \frac{C_2}{C_1} N_{seg,1}. \tag{42}$$

Therefore, $$N_m = N_{m,initial} + (r_L - 1)\frac{C_2}{C_1} N_{seg,1}(n+1). \tag{43}$$

$C_2/C_1$ is a constant, and it is influenced by the value of $r_{L/d,critical}$. The smaller $r_{L/d,critical}$ is, the larger $C_2/C_1$ is. $N_{seg,1}$ is the number of fracture segments in the EDFM if no refinement is applied. Equation (43) shows that when $r_L$ is constant, $N_m$ increases with the increase of n. Hence, n=2 is chosen to obtain a minimum $N_m$.

If a single level LGR is used instead of nested LGR, to obtain the same $r_L$, $$n = r_L, \tag{40}$$

$$N_m = N_{m,initial} + (r_L^2 - 1)\frac{C_2}{C_1} N_{seg,1}. \tag{41}$$

The total number of gridblocks will be much larger than that with nested LGR.

For three-dimensional cases with inclined fractures (where refinement in all three directions is required), $$N_{seg,i} = \frac{C_1}{L_{i-1}^2}, \tag{44}$$

$$N_{refined,i} = \frac{C_2}{L_{i-1}^2}, \tag{45}$$

and $$N_{added,i} = N_{refined,i}(n^3 - 1). \tag{46}$$

Therefore, $$\begin{aligned} N_m &= N_{m,initial} + \sum_{i=1}^{N_{lgr\text{-}level}} N_{added,i} \\ &= N_{m,initial} + \frac{C_2}{C_1} N_{seg,1}(r_L^2 - 1)\frac{n^2 + n + 1}{n+1} \end{aligned} \tag{47}$$

Similarly, n=2 gives a minimum $N_m$. However, as can be noted in Equation (47), $N_m$ increases rapidly with the increase of $r_L$ compared to the two-dimensional cases. Therefore, for three-dimensional cases with inclined fractures, within a reasonable $N_m$, a smaller $r_L$, compared to two-dimensional cases, can be achieved. As the simulation of fracture transient flow typically requires a high $r_L$, the case studies are focused on two-dimensional simulations. However, for other types of problems (as will be discussed below), the three-dimensional nested LGR can still be used to improve the simulation accuracy.

EDFM with LGR. It has been shown in the above derivation that using the EDFM formulations together with nested LGR can effectively reduce the sizes of gridblocks around the fractures while keeping a relatively low cell count. In some embodiments, application of EDFM with nested LGR is performed by implementing the geometrical calculations and transmissibility formulations of the EDFM in structured grids with nested LGR. Compared to structured grids without LGR, the calculation of connections between fracture segments (Type II NNCs) may present a challenge. Introduction of LGR complicates the connection relationship between matrix gridblocks. As the connections between fracture segments mimic the connections between matrix gridblocks to some extent, the Type II connections in the EDFM may also be complicated, especially for grids with nested LGR. A complexity in the geometrical calculation is that fracture segments in neighboring matrix gridblocks (can be coarse gridblocks or subgridblocks) may partially share an edge. This also occurs in corner-point grids.

Figure 23:
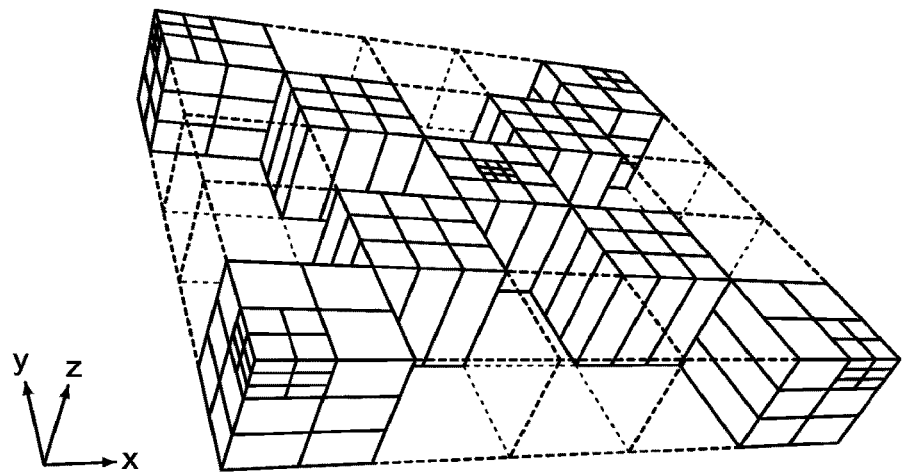
FIG. 23 depicts a 3D subterranean grid with nested local grid refinement in accordance with some embodiments of the present disclosure.
Figure 24A:
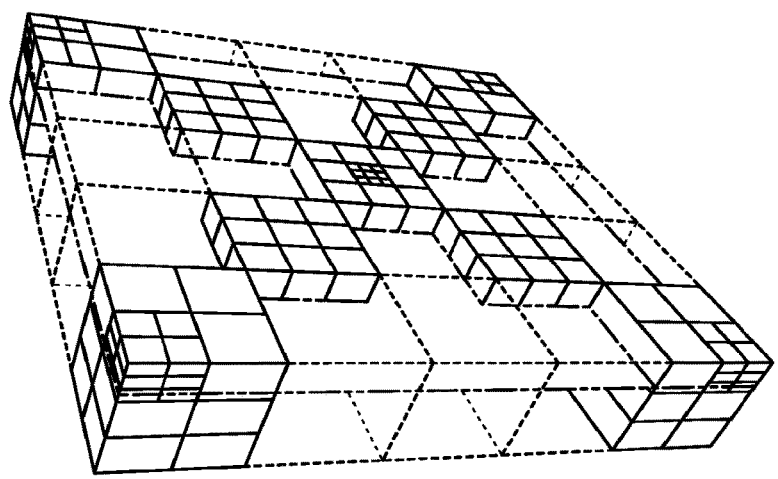
FIG. 24A depicts a 3D subterranean grid with a fracture located parallel to the x-y plane.
Figure 24B:
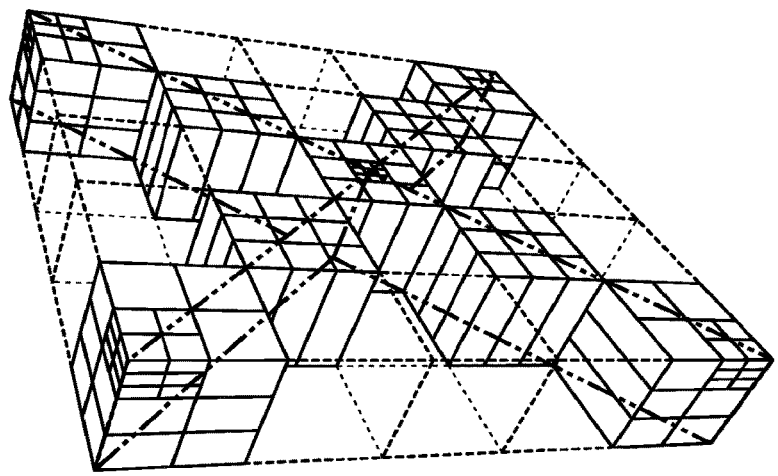
FIG. 24B depicts a 3D subterranean grid with two fractures located parallel to the z-axis.
Figure 24C:
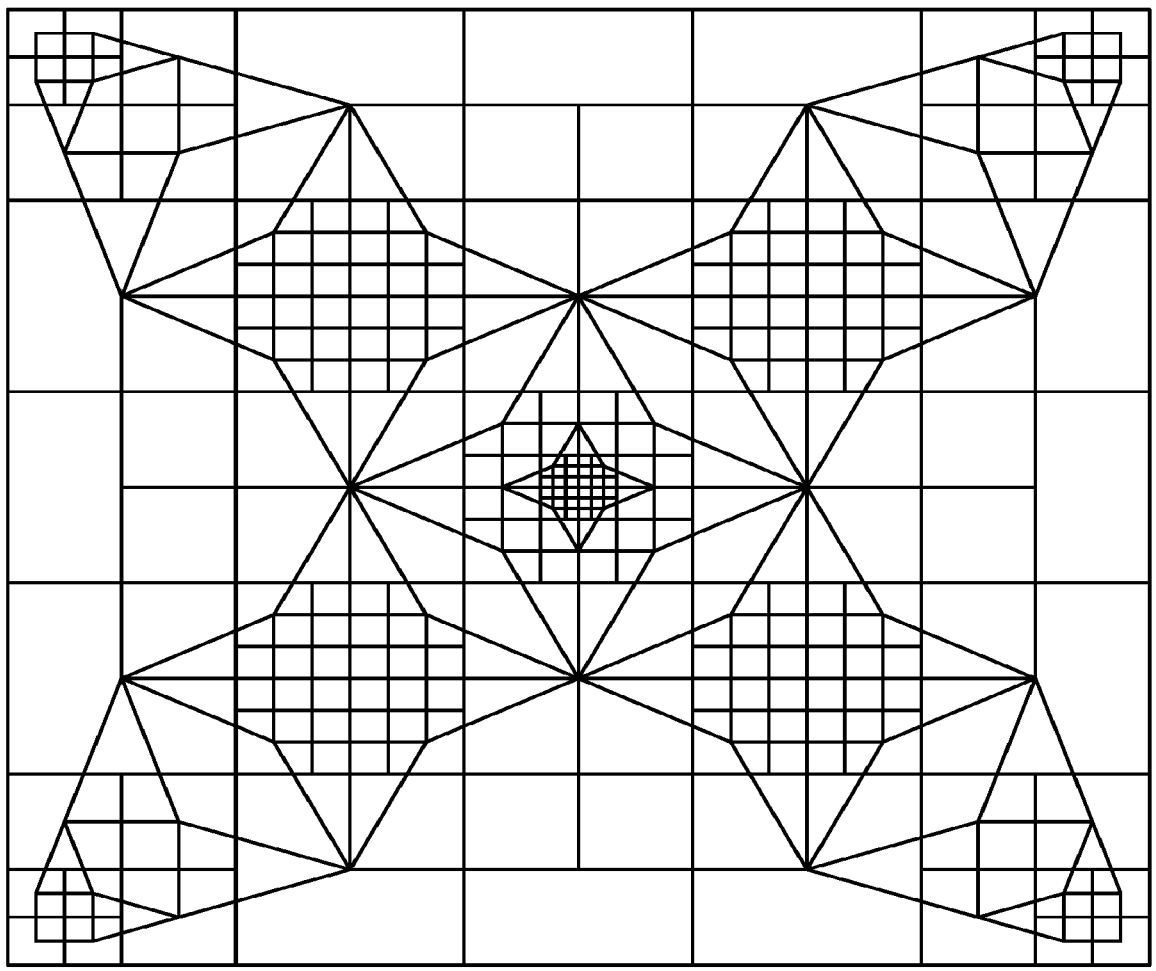
FIG. 24C depicts the displayed connections between fracture segments for the fracture of FIG. 24A in accordance with some embodiments of the present disclosure.
Figure 24D:
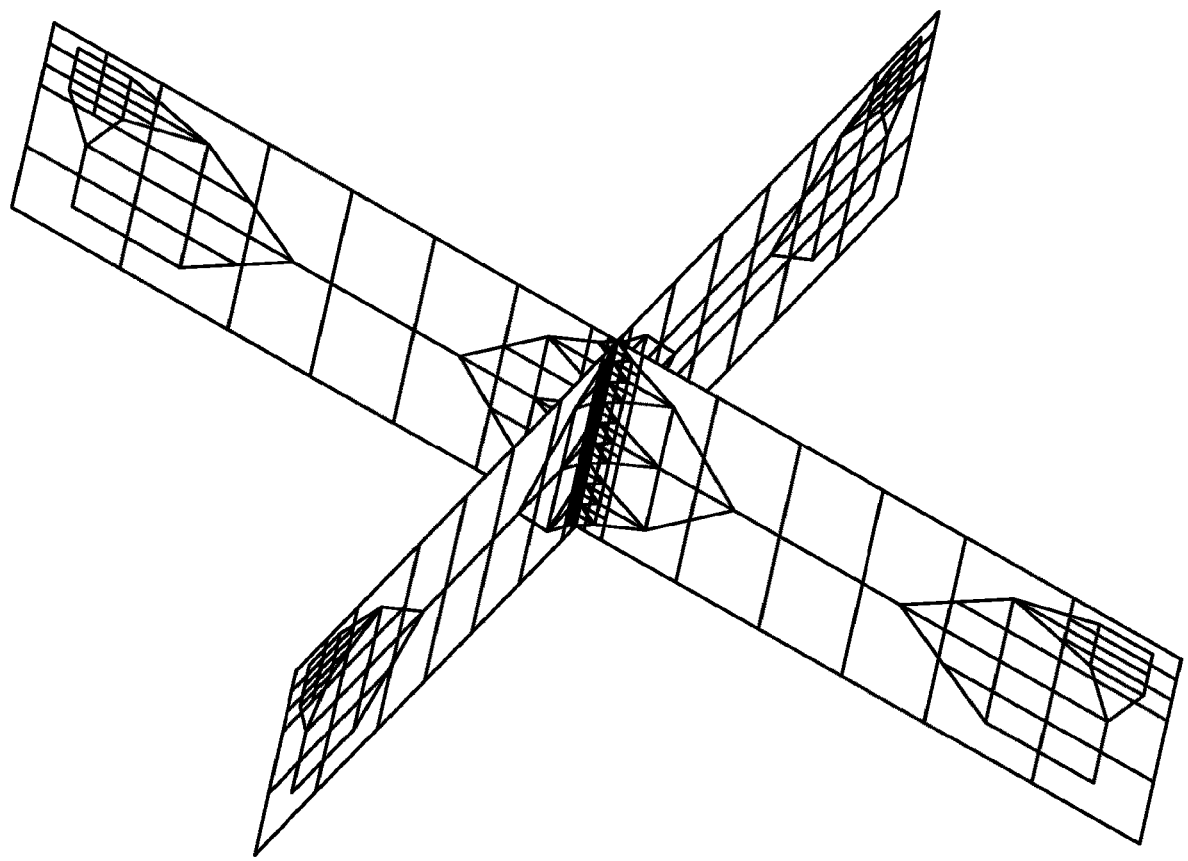
FIG. 24D depicts the displayed connections between fracture segments for the fractures of FIG. 24B in accordance with some embodiments of the present disclosure.

FIG. 23 depicts a Cartesian matrix grid with nested LGR as an example to illustrate the complexity of Type II NNCs. FIGS. 24A-24D depict two sets of fractures with different orientations and the corresponding Type 2 NNCs between fracture segments. The complexity regarding the connections can be observed. In FIG. 24A a fracture is located parallel to the x-y plane. In FIG. 24B two fractures are located parallel to the z-axis. FIG. 24C depicts the connections between fracture segments for the fracture in FIG. 24A. FIG. 24D depicts the connections between fracture segments for the fractures in FIG. 24B.

In general, the combination of LGR with EDFM improves the accuracy of the simulation results. Besides fracture transient flow, there are also other types of simulations that can benefit from the usage of LGR around fractures, such as: (i) a water—or gas—flooding case with large-scale fractures where the prediction of the breakthrough time of the injected fluid is critical; (ii) a simulation where the pressure drop around fractures can cause dramatic changes in phase behaviors; and (iii) a simulation with complex hydraulic fracture geometries where a refined grid can better reflect the fracture geometry. The combination of EDFM with LGR can also be used to reduce the number of fracture segments in a single gridblock. This can be achieved by finding gridblocks penetrated by more than a certain number of fractures and conducting refinement for such gridblocks. When the number of fracture segments in a gridblock is decreased, a more accurate calculation of matrix-fracture fluid transfer can be obtained considering a linear pressure distribution assumption.

Figure 25:
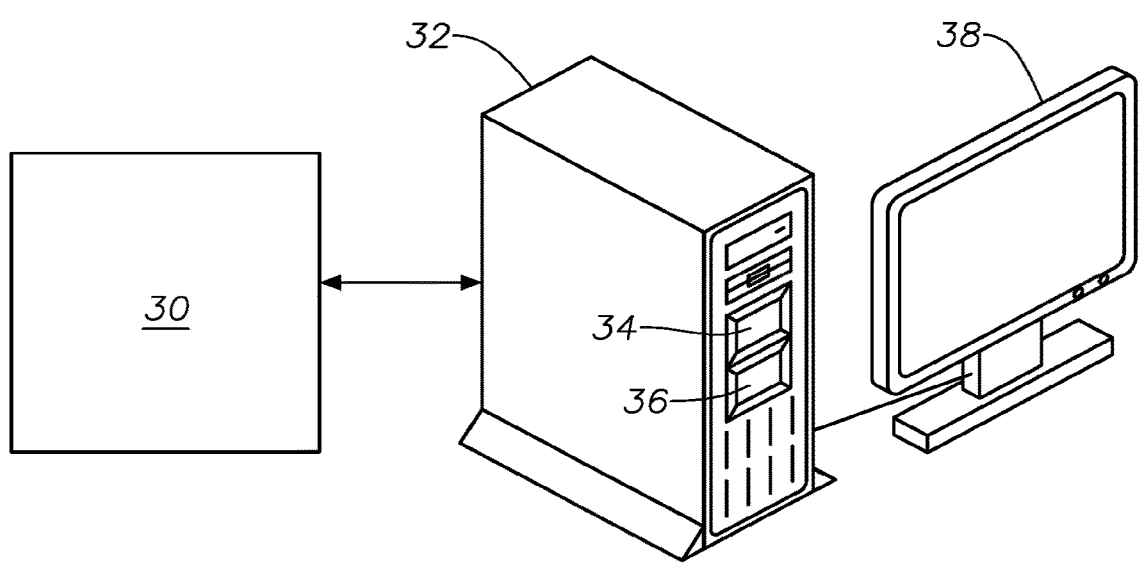
FIG. 25, in accordance with some embodiments of the present disclosure, depicts a system for simulating subsurface regions with complex fracture geometries.

As previously described, a preprocessor algorithm is used to perform the disclosed calculations. FIG. 25 depicts a system for implementation of embodiments of this disclosure. A simulator module 30 is linked to a computer 32 configured with a microprocessor 34 and memory 36 that can be programmed to perform the steps and processes disclosed herein. The output values calculated by the computer 32 are used as data input (commonly referred to as "keywords") to the simulator module 30 for generation of the desired simulation. In this manner, the disclosed EDFM formulations are applied in a non-intrusive way in conjunction with conventional simulators with NNC functionality. The EDFM keeps the grids of conventional simulators and models the fractures implicitly through different types of connection factors as described herein, without requiring access to or use of the simulator's source code. Alternatively, some embodiments may be implemented as a unitary application (i.e. wherein one module performs both the simulator and preprocessor functions). A display 38 is linked to the computer 32 to provide a visual output of the simulation results. It will be appreciated by those skilled in the art that conventional software and computer systems may be used to implement the embodiments. It will also be appreciated that programming of the computer 32 and microprocessor 34 can be implemented via any suitable computer language coding in accordance with the techniques disclosed herein. In some embodiments, the simulator module 30 may be remotely located (e.g. at a field site) and linked to the computer 32 via a communication network.

Another process for simulating a subterranean region having fracture geometries, according to this disclosure includes: detecting geometrical intersections between matrix gridblocks and fractures associated with the subterranean region; cutting the fractures into segments along matrix gridblock boundaries; applying a pore-volume cutoff for small fracture segments; defining Type 1 NNCs; calculating connections between segments inside a fracture (Type 2 NNCs) and between connected segments belonging to intersecting fractures (Type 3 NNCs); calculating intersections between well trajectories and fracture segments; computing transmissibility factors for three types of NNCs and effective well indices; creating gridblocks in the grid domain and modifying their properties (pore volume, permeability, depth, etc.) to represent fracture segments; canceling all existing connections and adding non-neighboring connections (three types) for the newly-added fracture gridblocks; adding additional well perforations on fracture gridblocks; and running a reservoir simulator to produce an output simulation.

Advantages provided by the embodiments of this disclosure include the ability to accurately simulate subsurface characteristics and provide useful data (e.g., transient flow around fractures, fluid flow rates, fluid distribution, fluid saturation, pressure behavior, geothermal activity, well performance, formation distributions, history matching, production forecasting, saturation levels, sensitivity analysis, temperature gradients, etc.), particularly for multi-scale complex fracture geometries. The embodiments are ideal for use in conjunction with commercial simulators in a non-intrusive manner, overcoming key limitations of low computational efficiency and complex gridding issues experienced with conventional methods. 2D or 3D multi-scale complex fractures can be directly embedded into the matrix grids, including structured grids and unstructured grids.

Embodiments of this disclosure can handle fractures with any complex boundaries and surfaces with varying roughness. It is common for fractures to have irregular shapes and varying properties (e.g. varying aperture, permeability) along the fracture plane. In such cases, the fracture shape can be represented using a polygon or polygon combinations to define the surface contours and performing the geometrical calculation between the fracture and the matrix block. The polygon(s) representing the fracture shape can be convex or concave. Embodiments can handle different types of structured grids, including Cartesian grids and complex corner-point grids.

Embodiments of this disclosure provide for simulation of processes entailing hydrocarbon production or enhanced oil recovery using compositional or black oil formulations. The embodiments can also handle single-phase, multiple-phase, isothermal and non-isothermal processes, single well, multiple wells, single porosity models, dual porosity models, and dual permeability models. Other advantages provided by the disclosed embodiments include the ability to: transfer the fracture geometry generated from microseismic data interpretation to commercial numerical reservoir simulators for production simulation; transfer the fracture geometry generated from fracture modeling and characterization software to commercial numerical reservoir simulators for production simulation; and handle pressure-dependent matrix permeability and pressure-dependent fracture permeability. Since in a computer, several steps of the algorithm are working with floating-point numbers, appropriate tolerances for the geometrical calculations can be set. For example, tolerances can be set when checking whether two points have the same coordinates or whether three points are collinear.

Figure 26:
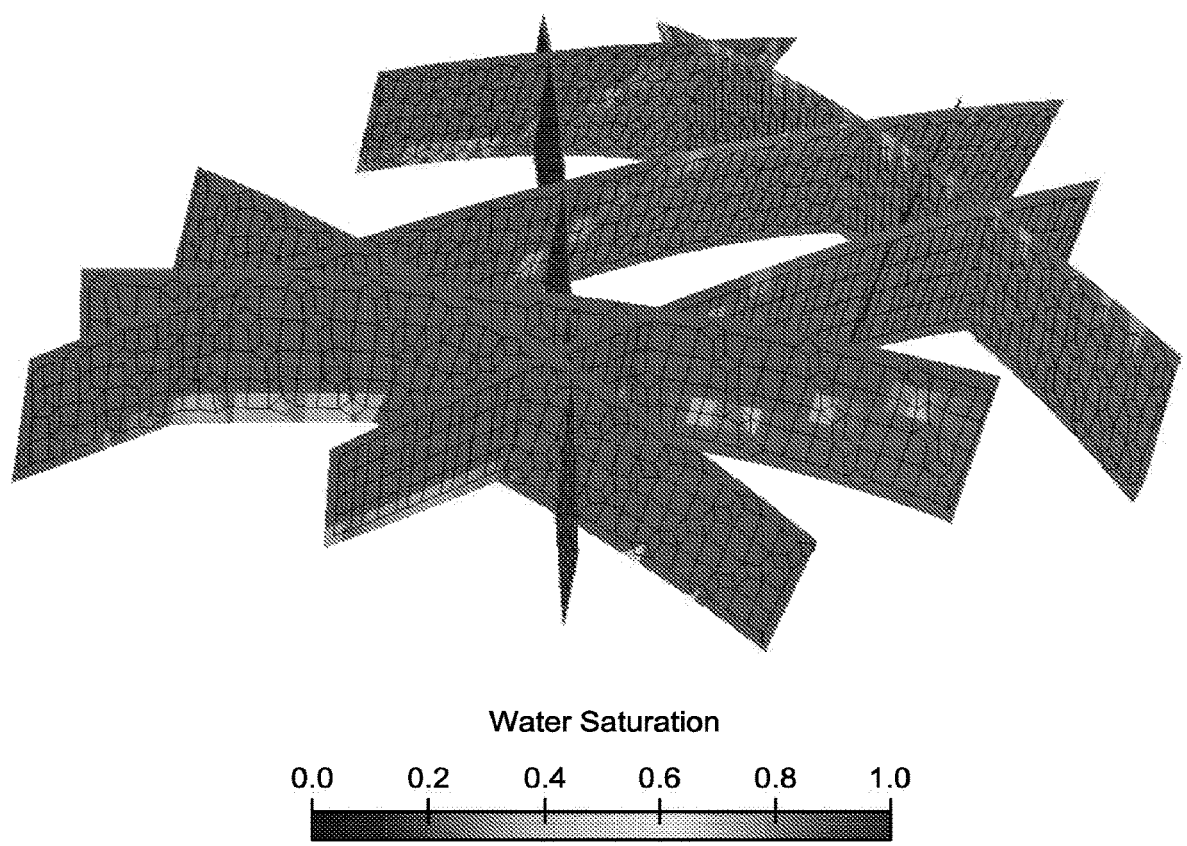
FIG. 26, in accordance with some embodiments of the present disclosure, depicts a visualization of a subsurface saturation profile including fractures.

FIG. 26 shows a profile of water saturation in fractures in 3D corner point grids produced with a disclosed embodiment. A water flooding process was simulated in a light oil reservoir. A reservoir model with irregular shape and variable thickness was discretized using a 50×50×5 corner point grid. Fractures were placed inside the reservoir. A water injector and a producer were placed at the corners of the reservoir. The initial fluid phases in the reservoir included water and oil, and water was at irreducible saturation. The gas phase appeared during reservoir depletion. The conductivity of the fractures was 10,000 md-ft, and the dip angle of the fractures ranged from 60° to 90°. After EDFM preprocessing, the fractures were discretized into a total number of 2,509 fracture segments. These fracture segments were represented as additional gridblocks in the computational domain. The darkened lines in FIG. 26 represent the connections between fracture segments. The scale in the z-direction is 5. As shown in FIG. 26, embodiments of this disclosure provide a powerful visualization tool. Unlike conventional applications that are limited to visualizations where the reservoir and fractures are coupled together, the present invention enables one to visualize the subsurface properties and characteristics separately and individually. Thus, embodiments of this disclosure now enable users to view and analyze the subsurface properties and characteristics of interest individually. Such properties and characteristics including, without limitation, fractures, fluid properties (e.g. density, viscosity, concentrations), reservoir properties (e.g. permeability, porosity, anisotropy), and pressure distributions.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as in "an embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered. This disclosure describes one or more embodiments wherein various operations are performed by certain systems, applications, modules, components, etc. In alternative embodiments, however, those operations could be performed by different components. Also, items such as applications, modules, components, etc., may be implemented as software constructs stored in a machine accessible storage medium, such as an optical disk, a hard disk drive, etc., and those constructs may take the form of applications, programs, subroutines, instructions, objects, methods, classes, or any other suitable form of control logic; such items may also be implemented as firmware or hardware, or as any combination of software, firmware and hardware, or any combination of any two of software, firmware and hardware. It will also be appreciated by those skilled in the art that embodiments may be implemented using conventional memory in applied computing systems (e.g., local memory, virtual memory, and/or cloud-based memory). The term "processor" may refer to one or more processors.

This disclosure may include descriptions of various benefits and advantages that may be provided by various embodiments. One, some, all, or different benefits or advantages may be provided by different embodiments. In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

Nomenclature

A=area, ft
B=formation volume factor
c=compressibility, $psi^{-1}$
$C_f$=fracture conductivity, md-ft
d=average distance, ft
dS=area element, $ft^2$
dV=volume element, $ft^3$
H=fracture height, ft
$H_s$=height of fracture segment, ft
k=reservoir permeability, md
$k_f$=fracture permeability, md
K=matrix permeability tensor, md
$K_a$=differential equilibrium portioning coefficient of gas at a constant temperature
L=fracture length, ft
$L_{int}$=length of fracture intersection line, ft
$L_s$=length of fracture segment, ft
$\vec{n}$=normal vector
N=number of nnc
p=pressure, psi
Q=volume flow rate, $ft^3$/day
re=effective radisu, ft
rw=wellbore radius, ft
$R_s$=solution gas-oil ratio, scf/STB
S=fracture segment area, $ft^2$
T=transmissibility, md-ft or temperature, ° F.
V=volume, $ft^3$
$V_b$=bulk volume, $ft^3$
$V_m$=langmuir isotherm constant, scf/ton
$w_f$=fracture aperture, ft
$\overline{w_f}$=average fracture aperture, ft
WI=well index, md-ft
x=distance, ft
$x_f$=fracture half length, ft
Δp=pressure drop, psi
λ=phase mobility, $cp^{-1}$
μ=viscosity, cp
ρ=density, $g/cm^3$
$\phi_f$=fracture effective porosity Subscripts and Superscripts a=adsorbed
b=bulk
c=common face
eff=effective
f=fracture
g=gas
j=phase
L=Langmuir
m=matrix
o=oil
seg=fracture segment
ST=stock tank Acronyms EDFM=Embedded Discrete Fracture Model
LGR=Local Grid Refinement
NNC=Non-Neighboring Connection
2D=Two-dimension(al)
3D=Three-dimension(al)

APPENDIX A

Derivation of Matrix-Fracture Transmissibility Factor

As shown in FIG. 2, the matrix cell is divided into 2 parts: A and B. We denote the volume of part A and part B as $v_A$ and $v_B$, respectively. The average pressure in the total matrix cell is $$p_m = (V_A p_A + V_B p_B)/(V_A + V_B), \quad (A1)$$

where $p_A$ and $p_B$ are the average pressure in part A and B, respectively. We assume the same pressure gradients in A and B as shown by the red arrows. Let $d_A$ and $d_B$ be the average normal distances from part A and part B to the fracture plane. The flow rate of phase j from the fracture surface 1 to part A is $$Q_{f-A} = T_{f-A} \lambda_j (p_f - p_A), \quad (A2)$$

where $p_f$ is the average pressure in the fracture segment, $T_{f-A}$ is the phase independent part of transmissibility between fracture and part A, and $\lambda_j$ is the relative mobility of phase j. $T_{f-A}$ can be calculated by $$T_{f-A} = A_f (K \cdot \vec{n}) \cdot \vec{n}/d_{f-A}, \quad (A3)$$

where $A_f$ is the area of the fracture segment on one side, K is the matrix permeability tensor, $\vec{n}$ is the normal vector of the fracture plane, $d_{f-A}$ is the average normal distance from part A to fracture, which can be calculated by $$d_{f-A} = \frac{\int_{V_A} x_n \, dV_A}{V_A}, \quad (A4)$$

$(p_f - p_A) \vec{n}/d_{f-A}$ is the pressure gradient. In the case of anisotropic matrix permeability, the flow direction may be different from the direction of pressure gradient. Therefore, the second $\vec{n}$ in the equation projects the flow velocity onto the normal direction of the fracture plane. Similarly, the flow rate of phase j from the fracture surface 2 to part B is $$Q_{f-B} = T_{f-B} \lambda_j (p_f - p_B), \quad (A5)$$

$$T_{f-B} = A_f (K \cdot \vec{n}) \cdot \vec{n}/d_{f-B}, \quad (A6)$$

and $$d_{f-B} = \frac{\int_{V_B} x_n \, dV_B}{V_B}. \quad (A7)$$

The total flow from fracture to matrix is $$Q_{f-m} = Q_{f-A} + Q_{f-B}. \quad (A8)$$

By the definition of $T_{f-m}$, $$Q_{f-m} = T_{f-m} \lambda_j (p_f - p_m) \quad (A9)$$

Assuming the same magnitude of pressure gradients on both sides of the fracture, we have $$\frac{p_f - p_A}{p_f - p_B} = \frac{d_{f-A}}{d_{f-B}}. \quad (A10)$$

Combining all these equations, we can obtain $$T_{f-m} = \frac{2 A_f (K \cdot \vec{n}) \cdot \vec{n}}{(V_A d_{f-A} + V_B d_{f-B})/(V_A + V_B)}. \quad (A11)$$

APPENDIX B

Algorithm to Calculate the Intersection Between a Polyhedron (Matrix Gridblock) and a Polygon (Fracture)

Given a gridblock G and a fracture polygon P, the steps to calculate the intersection between G and P are as follows:
1. Find a bounding box $B_1$ for G. The bounding box can be found by calculating the minimum and maximum x-, y-, and z-coordinates of the vertices of G.
2. Find a bounding box $B_2$ for P.
3. Check whether the two bounding boxes $B_1$ and $B_2$ intersect. If not, stop the algorithm, and there is no intersection between G and P.
4. Check whether all vertices of G are on one side of the plane containing P (denoted as P'). If yes, stop the algorithm, and there is no intersection between G and P.
5. Find the edge list {E} of G.
6. For each edge e in {E}, check whether the two vertices of e have the same coordinates (degeneracy). If yes, remove e from {E}, and merge the two vertices.
7. For each edge e in {E}, check whether the two vertices belonging to e have already been merged. If yes, remove e from {E}.
8. Find the original face list {F} of G. Each element f of {F} should contain four vertices.
9. For each face f in {F}, list the vertices and check whether any pair of the vertices has already been merged. If yes, remove one vertice in this pair from f.
10. For each face f in {F}, if f contains less than three vertices, remove f from {F}. If f contains four vertices, check whether the four vertices are coplanar. If not, split f into two faces, $f_1$ and $f_2$, with each containing three vertices, remove f from {F}, and add $f_1$ and $f_2$ into {F}.
11. Prepare three empty point lists $\{P_1\}$, $\{P_2\}$, and $\{P_3\}$ and an empty connection list {C}.
12. For each edge e in {E}, check the intersection between e and P'. If e and P' intersect, add the intersection point i into $\{P_1\}$. Record the gridblock faces in {F} that e belongs to. Notice that e may belong to multiple faces in {F}.
13. If $\{P_1\}$ contains less than three points, stop the algorithm, and there is no intersection between G and P
14. For each point p in $\{P_1\}$, check whether p is inside the fracture polygon P. If not, remove p from $\{P_1\}$. If all points in $\{P_1\}$ are inside P and P is convex, go directly to Step 19.
15. Find the edge list {E'} of the fracture polygon P. For each edge e' in {E' }, and each face f in {F}, check the intersection between e' and f. If e' and f intersect, add the intersection point i' into $\{P_2\}$. Record the gridblock faces in {F} and the fracture edges in {E'} that i' belongs to.
16. For each vertex v of the fracture polygon P, check whether v is inside G. If yes, add v into $\{P_3\}$. Record the fracture edges in {E'} that v belongs to.
17. Let $\{P_{12}\} = \{P_1\} \cup \{P_2\}$. For any pair of points $p_1$ and $p_2$ in $\{P_{12}\}$, if both $p_1$ and $p_2$ belong to a face in {F}, no other point in $\{P_{12}\}$ is on line segment $p_1$-$p_2$, and the midpoint of line segment $p_1$-$p_2$ is inside P, add $(p_1, p_2)$ into {C}.
18. Let $\{P_{23}\} = \{P_2\} \cup \{P_3\}$. For any pair of points $p_1$ and $p_2$ in $\{P_{23}\}$, if both $p_1$ and $p_2$ belong to an edge e in {E'}, no other point in $\{P_{23}\}$ is on line segment $p_1$-$p_2$, and the midpoint of line segment $p_1$-$p_2$ is inside G, add $(p_1, p_2)$ into {C}.
19. Let $\{P_{123}\} = \{P_1\} \cup \{P_2\} \cup \{P_3\}$. Check if any two points $p_1$ and $p_2$ in $\{P_{123}\}$ have the same coordinates. If yes, remove $p_2$ from $\{P_{123}\}$, and replace $p_2$ with $p_1$ in each element of $\{C\}$. Repeat this step until there are no coincident points in $\{P_{123}\}$.
20. Check the number of points in $\{P_{123}\}$. If $\{P_{123}\}$ contains less than three points, stop the algorithm, and there is no intersection between G and P. Otherwise, there is an intersection between G and P.
21. For each element c in $\{C\}$, check if the two points in c are the same. If yes, remove c from $\{C\}$.
22. Use the connection list $\{C\}$ to arrange the sequence S of points in $\{P_{123}\}$. The points should be arranged in a way such that all pairs of the neighboring points $(p_1,p_2)$ in S, including the pair containing the first and the last points in S, appear in the connection list $\{C\}$.
23. Output the points in $\{P_{123}\}$ using sequence S. This gives the intersection polygon between G and P.

This algorithm finds out whether the fracture intersects the gridblock. If there is an intersection, it outputs the polygon representing the fracture segment. As can be seen, the input of the algorithm is a general polyhedron and a general polygon, which indicates that the application of this algorithm is not limited to corner point grids. It is also valid for Cartesian grids and unstructured grids. Several simpler problems are embedded in this algorithm. For example, Step 15 solves the intersection between a polygon and a line segment, which can be divided into three problems: the intersection between a line and a plane, the checking of whether a point is inside a polygon, and the checking of whether a point belongs to a line segment. Steps 14 and 16 involve checking whether a point is inside a polygon or a polyhedron, which can be solved by first checking whether the point is inside the bounding box of the polygon or the polyhedron, and then using the ray-casting algorithm. Several steps are added in this algorithm to take care of special situations. For instance, Step 7 is necessary when more than two vertices of the gridblock have the same coordinates. Step 19 also plays an important role if the fracture polygon crosses through the edges or the vertices of the gridblock. Steps 1-4 are added to speed up the calculation, as in most cases the algorithm will stop after Step 3 or Step 4. When there is an intersection between G and P, the total number of required basic computations (such as line-plane intersection and line-line intersection calculation) is a function of the number of edges of G, the number of vertices of P, and the number of vertices of the intersection polygon.

What is claimed is:

1. A method for simulating a subterranean region having fracture geometries, comprising:
    a) obtaining by a processor data produced by a digital simulator module, the data representing a subterranean region and comprising a matrix grid and fracture parameters representing fractures in the subterranean region;
    b) producing, by the processor, a computational domain separate from the digital simulator module;
    c) inputting, by the processor, the data produced by the digital simulator module into the computational domain;
    d) identifying, in the computational domain, gridblocks close to fractures in the matrix grid produced by the simulator module;
    e) refining, in the computational domain, the size of gridblocks among the identified matrix gridblocks;
    f) determining, in the computational domain, if the refined gridblocks meet a specified criterion;
    g) repeating, in the computational domain, steps (d)-(f) if the criterion of step (f) is not met;
    h) proceeding to step (i) if the criterion of step (f) is met;
    i) calculating, in the computational domain, intersections between the refined gridblocks and the fractures;
    j) inputting, by the processor, the calculated intersections from the computational domain into the digital simulator module; and
    k) generating a simulation of the subterranean region with the digital simulator module using the calculated intersections.

2. The method of claim 1, wherein the specified criterion is $L_n > L_{final}$, where $L_n$ is a gridblock length and $L_{final}$ is a defined gridblock length.

3. The method of claim 2, wherein the specified criterion further comprises $r_{L/d} > r_{L/d,critical}$, where $$r_{L/d} = \frac{L_n}{d_{g-f}},$$

$L_n$ is a gridblock length and $d_{g-f}$ is a minimum distance from a gridblock to a fracture, and $r_{L/d,critical}$ is a defined ratio.

4. The method of claim 1, wherein the calculating intersections between the refined gridblocks and the fractures comprises identifying geometric relationships between created fracture cells and the refined gridblock.

5. The method of claim 1, wherein the calculating intersections between the refined gridblocks and the fractures comprises identifying connections between fracture cells and the refined grid blocks.

6. The method of claim 1, further comprising:
    step (a) including obtaining data representing a subterranean region including wellbore parameters;
    calculating a well index between created fracture cells and wellbore cells associated to the wellbore parameters; and
    step (k) including using the calculated well index for generation of the subterranean region simulation.

7. The method of claim 6, further comprising:
    identifying geometric interactions between fractures and the wellbore cells; and
    adding a well location to the created fracture cells for each segment of a fracture interacting with a wellbore cell.

8. The method of claim 1, wherein the generation of a simulation of the subterranean region comprises generation of a geometry including at least one of: (i) a complex boundary, (ii) a complex surface, or (iii) a corner point.

9. The method of claim 1, wherein the generation of a simulation of the subterranean region comprises a visualization of at least one of: (i) a fluid property, (ii) a reservoir property, or (iii) a pressure distribution.

10. A system for simulating a subterranean region having fracture geometries, comprising:
    at least one processor;
    a non-transitory memory linked to the processor, the memory having instructions stored therein, which when executed cause the processor to perform functions including to:
        a) input data from a digital simulator module, the data representing a subterranean region and comprising a matrix grid and fracture parameters representing fractures in the subterranean region;
        b) produce a computational domain separate from the digital simulator module;
        c) input the data from the digital simulator module into the computational domain;

d) identify, in the computational domain, gridblocks close to fractures in the matrix grid produced by the simulator module;

e) refine, in the computational domain, the size of gridblocks among the identified matrix gridblocks;

f) determine, in the computational domain, if the refined gridblocks meet a specified criterion;

g) repeat, in the computational domain, steps (d)-(f) if the criterion of step (f) is not met;

h) proceed to step (i) if the criterion of step (f) is met;

i) calculate, in the computational domain, intersections between the refined gridblocks and the fractures; and j) input the calculated intersections from the computational domain into the digital simulator module; and k) generate a simulation of the subterranean region with the digital simulator module using the calculated intersections.

11. The system of claim 10, wherein the specified criterion is $L_n > L_{final}$, where $L_n$ is a gridblock length and $L_{final}$ is a defined gridblock length.

12. The system of claim 11, wherein the specified criterion further comprises $r_{L/d} > r_{L,critical}$, where $$r_{L/d} = \frac{L_n}{d_{g-f}},$$

$L_n$ is a gridblock length and $d_{g-f}$ is a minimum distance from a gridblock to a fracture, and $r_{L/d,critical}$ is a defined ratio.

13. The system of claim 10, wherein the function to calculate intersections between the refined gridblocks and the fractures comprises identification of geometric relationships between created fracture cells and the refined gridblocks.

14. The system of claim 10, wherein the function to calculate intersections between the refined gridblocks and the fractures comprises identification of connections between fracture cells and the refined gridblocks.

15. The system of claim 10, wherein the functions performed by the processor further include functions to:

input data from the digital simulator module representing a subterranean region including well parameters;

calculate a well index between created fracture cells and wellbore cells associated to the wellbore parameters; and use the calculated well index for the generation of the simulation of the subterranean region.

16. The system of claim 10, wherein generation of a simulation of the subterranean region comprises generation of a geometry including at least one of: (i) a complex boundary, (ii) a complex surface, or (iii) a corner point.

17. The system of claim 10, wherein the generation of a simulation of the subterranean region comprises a visualization of at least one of: (i) a fluid property, (ii) a reservoir property, or (iii) a pressure distribution.

18. A method for simulating a subterranean region having fracture geometries, comprising:

obtaining by a processor data produced by a digital simulator module, the data representing a subterranean region and comprising a matrix grid and fracture parameters representing fractures in the subterranean region;

producing, by the processor, a computational domain separate from the digital simulator module;

inputting, by the processor, the data produced by the digital simulator module into the computational domain;

detecting, in the computational domain, geometrical intersections between matrix grid blocks and fractures in the data produced by the simulator module;

cutting, in the computational domain, the fractures into segments along matrix gridblock boundaries;

applying, in the computational domain, a pore-volume cutoff for small fracture segments;

calculating, in the computational domain, connections between segments inside a fracture and between connected segments belonging to intersecting fractures;

calculating, in the computational domain, intersections between well trajectories associated with the subterranean region and fracture segments;

computing, in the computational domain, transmissibility factors for non-neighboring connections and well indices associated with the subterranean region;

creating, in the computational domain, gridblocks in a grid domain and modifying the gridblock properties to represent fracture segments;

canceling, in the computational domain, connections and adding non-neighboring connections for the created gridblocks;

adding, in the computational domain, well perforations on the gridblocks;

inputting, by the processor, the gridblocks from the computational domain into the digital simulator module, and generating a simulation of the subterranean region a with the digital simulator module.

* * * * *